United States Patent [19]

Mihara

[11] Patent Number: 5,796,528
[45] Date of Patent: Aug. 18, 1998

[54] WIDE-ANGLE LENS SYSTEM

[75] Inventor: Shinichi Mihara, Tama, Japan

[73] Assignee: Olympus Optical Co., Ltd., Tokyo, Japan

[21] Appl. No.: 800,668

[22] Filed: Feb. 14, 1997

[30] Foreign Application Priority Data

| Feb. 15, 1996 | [JP] | Japan | 8-027756 |
| Jul. 29, 1996 | [JP] | Japan | 8-214952 |

[51] Int. Cl.$^6$ .................................................. G02B 13/04
[52] U.S. Cl. .......................... 359/753; 359/749; 359/793
[58] Field of Search .................................. 359/749, 750, 359/751, 752, 753, 765, 766, 773, 774, 785, 793

[56] References Cited

U.S. PATENT DOCUMENTS

| 2,594,020 | 4/1952 | Hopkins et al. | 359/753 |
| 4,130,349 | 12/1978 | Hyakumura | 359/753 |
| 4,221,467 | 9/1980 | Imai | 359/763 |
| 4,493,536 | 1/1985 | Kudo | 350/462 |
| 5,233,474 | 8/1993 | Hirakawa | 359/717 |
| 5,251,073 | 10/1993 | Schauss | 359/715 |
| 5,513,046 | 4/1996 | Toyama | 359/752 |

*Primary Examiner*—Georgia Y. Epps
*Assistant Examiner*—Dawn-Marie Bey
*Attorney, Agent, or Firm*—Cushman Darby & Cushman IP Group of Pillsbury Madison & Sutro LLP

[57] ABSTRACT

The invention proves a compact and simple wide-angle lens system composed of a reduced number of lenses and having high productivity, which is well suited for use on digital cameras, while making sure of the space necessary for edge, and middle thicknesses, and constructing the system and, at the same time, having a given back focus and exit pupil position, and sufficient image-forming capability, and which comprises two lens groups or, in order from the object side thereof, a negative lens group GN and a positive lens group GP with an aperture stop D midway between them and a lens located nearest to the object side thereof being defined by a positive lens, said positive lens conforming to three conditions in terms of focal length, shape factor, and ensuring sufficient edge thickness.

6 Claims, 3 Drawing Sheets

WIDE-ANGLE LENS SYSTEM

BACKGROUND OF THE INVENTION

1. Field of the Invention

The present invention relates to a wide angle image pickup lens system for electronic cameras, which has a particularly short focal length and is of compact and simple structure comprising a reduced number of lenses.

2. Description of Related Art

In recent years, electronic cameras (digital cameras) have attracted attention as cameras of the next generation that supersede silver halide 35 mm-film cameras (usually called Leica size cameras). The size of image pickup devices used on such digital cameras is only a small, or very small, fraction of that or silver halide 35 mm-film cameras, as expressed in terms of diagonal length. To obtain images having the same angle of filed, therefore, it is required to reduce the focal length of an image-forming lens system in proportion to that. Theoretically, the size of the lens system becomes small, correspondingly, and so component elements become small, too. Lens processing is thus extremely difficult. In view of the characteristic features of an electronic image pickup device, on the other hand, it is desired that the angle of emergence of relays from the image-forming lens system be as vertical to the image pickup device as possible. Thus, it is difficult to use conventional wide-angle lens systems (e.g., retrofocus lens systems )for silver halide 35 mm-film cameras (usually called Leica size cameras) directly on digital cameras.

SUMMARY OF THE INVENTION

An object of the present invention is to provide a small and simple side angle lens system comprising a reduced number of lens elements that is excellent in productivity, which is well-suited for use on digital cameras, while having a given back focus and exit pupil position and sufficient image-forming capability and ensuring the space needed for edge and middle thicknesses of lens component elements and constructing the system.

According one aspect of the first embodiment of the invention, the aforesaid object is achieved by providing a wide-angle lens system comprising two lens groups, in order from the object side of the system, a negative lens group and a positive lens group with an aperture stop midway between them, in which a lens located nearest to the object side is defined by a positive lens, and which, in terms of power and shape of that positive lens, satisfies the following conditions:

$$2.5 < f_1/f \leq 10 \quad \text{(I-1)}$$

a1

$$0.25 < d_1/f < 0.8 \quad \text{(I-3)}$$

where f is the focal length of the overall lens system, and $f_1$, $r_1$, $r_2$, and $d_1$ are the focal length of the positive lends located nearest to the object side of the system, the radius of curvature of an object-side surface thereof, the radius of curvature of an image-side surface thereof, and an optical axis thickness thereof, respectively.

According to another aspect of the first embodiment of the invention, there is provided a wide-angle lens system comprising two lens groups or, in order from the object side of the system, a negative lens group and a positive lens group with an aperture stop midway between them, in which a lens located nearest to the image side of the system is defined by a double-convex lens, and which, in terms of power and shape that double-convex lens, satisfies the following conditions:

$$1.4 < f_R/f < 3 \quad \text{(I-4)}$$

$$-0.5 < (r_{R1}+r_{R2})/(r_{R1}-r_{R2}) < 0.5 \quad \text{(I-5)}$$

$$0.5 < d_R/f < 1 \quad \text{(I-6)}$$

where f is the focal length of the overall lens system, and $f_R$, $r_{R1}$, $r_{R2}$, and $d_R$ are the focal length of the double-convex lens located nearest to the image side of the system, the radius of curvature of an object-side surface thereof, the radius of curvature of an image-side surface thereof, and the optical axis thickness thereof, respectively.

According to yet another aspect of the first embodiment of the invention, there is provided a wide-angle lens system comprising two lens groups or, in order from the object side of the system, a negative lens group and a positive lens group with an aperture stop between them, in which a lens located nearest to the object side of the system is defined by a positive lens and a lens located nearest to the image side thereof is defined by a double-convex lens, and which, in terms of power and shape of both said lenses, satisfies the following conditions:

$$2.5 < f_1/f < 10 \quad \text{(I-1)}$$

$$1.4 < f_R/f < 3 \quad \text{(I-4)}$$

a2

$$-0.5 < (r_{R1}+r_{R2})/(r_{R1}-r_{R2}) < 0.5 \quad \text{(I-5)}$$

$$0.25 < d_1/f < 0.8 \quad \text{(I-3)}$$

$$0.5 < d_R/f < 1 \quad \text{(I-6)}$$

where f is the focal length of the overall lens system; $f_1$, $r_1$, $r_2$, and $d_1$ are the focal length of the positive lens located nearest to the object side of the system, the radius of curvature of an object-side surface thereof, the radius of curvature of an image-side surface thereof, and the optical axis thickness thereof, respectively; and $f_R$, $r_{R1}$, $r_{R2}$, and $d_R$ are the focal length of the double-convex lens located nearest to the image side of the system, the radius of curvature of an object-side surface thereof, the radius of curvature of an image-side surface thereof, and the optical axis thickness thereof, respectively.

A lens system according to the second embodiment of the invention has a very short focal length because it is a wide-angle lens system used on an image pickup device of small size. It is required ensure a space between the lens system and the image pickup device, in which space a filter and a cover glass for the image pickup device are located, and so it is necessary to make the back focus of the lens system longer than the focal length thereof. For this reason, the lens system is composed of two groups, or a lens group of negative power and a lens group of positive power in order from the object side thereof. Accordingly, the power of the lens system concentrates on the rear lens group, and so the number of lenses in the rear lens group becomes large. To make sure of the edge and middle thicknesses of each of the elements forming the lens system, it is required to reduce an air separation as much as possible. Consequently, it is impossible to locate a stop in the rear lens groups as is the case with a conventional wide-angle lens system for silver halide 35 mm-film cameras (usually called Leica size cameras). In the lens system according to the invention, therefore, an aperture stop is located between the two lens groups.

To reduce the number of lenses forming the lens system by as many as possible, it is required to make maximum correction for aberrations with a minimum number of lenses. In the lens system of the invention, therefore, the aforesaid negative lens groups (front lens group) is composed of up to two lenses in all, inclusive of one negative meniscus lens having a strong negative concave surface directed to the image side of the system. On the other hand, the aforesaid positive lens group (rear lens group) is made up of up to three lenses in all, including a double-convex form of lens element consisting of a single lens or a cemented lens and located nearest to the image side of the lens system.

Since the thickness of the rear lens groups (positive lens group) with respect to the focal length of the overall lens system is likely to increase, it is required to increase the powers of the aforesaid negative (front) and positive (rear) lens groups, thereby making sure of a given back focus. With the powers of both the lens groups increased, however, distortion becomes unacceptably large when the lens system is used on general digital cameras, except when it is used on supervisory cameras.

In the lens system according to the second embodiment of the invention, the positive lens or positive meniscus lens is located on the side of the negative (front) lens group nearest to an object, as already mentioned, said positive lens or positive meniscus lens being larger in power on the object side of the system than on the image side thereof. In addition to this, the negative meniscus lens having a strong concave surface directed to the image side of the system is provided. It is here to be noted that the front lens group may be composed of one negative meniscus lens having an aspheric surface on the object side of the system.

Alternatively, the negative meniscus lens of the front lens group may be made up of a spherical lens composed of, in order form the object side of the system, a negative meniscus lens element and a positive lens element stronger in curvature on the image side of the system than on the object side thereof.

A lens component of the positive (rear) lens group nearest to the image side of the system takes part in effective correction for aberrations while the system is made telecentric on its emergent side, and is preferably made up of a double-convex lens element unlike a conventional wide-angle lens system for silver halide 35 mm-film cameras.

In short, the rear lens group of the lens system according to the second embodiment of the invention is made up of up to three lenses in all, including a double-convex form of positive lens component composed of a single or cemented lens and located nearest to the image side of the system.

The lens system according to the second embodiment of the invention is characterized by being constructed as mentioned above, and satisfying the following conditions as well.

More specifically, the lens system according to the second embodiment of the invention is constructed from a negative lens group, a stop and a positive lens group wherein the front lens group comprises two lenses or, in order from the object side of the system, a positive lens larger in power at an object=side surface thereof than at an image-side surface thereof, and a negative meniscus lens having a strong concave surface directed to the image side of the system, and the rear lens group comprises up to three lenses in all, including a double-convex form of lens composed of a single or cemented lens element and located nearest to the image side of the system. It is then desired that the following conditions (II-1), (II-2), (II-3), and (II-4) be satisfied:

$$-0.5 < f/f_F < -0.2 \quad \text{(II-1)}$$

$$0.2 < D_{FS}/D_{SR} < 1.2 \quad \text{(II-2)}$$

$$1.5 < D_{SR}/f < 5 \quad \text{(II-3)}$$

$$-0.5 < (r_{R1}+r_{R2})/(r_{R1}-r_{R2}) < 0.5 \quad \text{(II-4)}$$

where f is the focal length of the overall lens system, $f_F$ is the focal length of the front lens group, $D_{FS}$ is the distance from a surface vertex of the front lens group located nearest to the object side of the system to the aperture stop, $D_{SR}$ is the distance from the aperture stop to a surface vertex of the rear lens group located nearest to the image side of the system, and $r_{R1}$ and $r_{R2}$ are the paraxial radii of curvature of object- and image-side surfaces of the double-convex form of lens component of the rear lens group located nearest to the image side of the system, respectively.

Why the aforesaid arrangements are used and how they work will now be explained together with their preferred constructions. The first embodiment of the invention will now be explained at great length.

An image-forming lens system designed for digital cameras has a very short focal length because it is a wide-angle lens system used on an image pickup device of small size. It is required to make sure of a space between the lens system and the image pickup device, in which space a filter and a cover glass for the image pickup device are located, and so it is necessary to make the back focus of the lens system longer than the focal length thereof. For this reason, the lens system is composed of two lens groups, or a negative lens group and a positive lens group in order from the object side thereof. Accordingly, the power of the lens system concentrates on the rear lens group, and so the number of lenses in the rear lens group becomes large. To make sure of the edge and middle thicknesses of each of the lens component elements, it is required to reduce an air separation as much as possible. Consequently, it is impossible to locate a stop in the rear lens group as is the case with a conventional wide-angle lens system for silver halide 35 mm-film cameras (usually called Leica size cameras). In the lens system according to the invention, therefore, an aperture stop is located midway between the two lens groups.

Since the thickness of the rear lens group is likely to increase, it is required to make the powers of the aforesaid two lens groups much larger, thereby making sure of a given back focus. With the powers of both the lens groups increased, however, distortion becomes unacceptably large when the lens system is used on general digital cameras, except when it is used on supervisory cameras. In the present invention, therefore, a positive lens that satisfies the following conditions is located on the side of the negative (front) lens group nearest to an object; that is, the focal length and shape factor thereof are defined as follows:

$$2.5 < f_1/f < 10 \quad \text{(I-1)}$$

a3 where f is the focal length of the overall lens system, and $f_1$, $r_1$, and $r_2$ are the focal length of the positive lens located nearest to the object side of the system, the radius of curvature of an object-side surface thereof, and the radius of curvature of an image-side surface thereof, respectively.

Exceeding the upper limit in condition (I-1) or 10 is not preferable because barrel distortion tends to occur due to a decreased effect on distortion correction. The effect of the positive lens on making correction for chromatic aberration, coma, and curvature of field, too, becomes slender. When the lower limit of 2.5 is not reached, on the other hand, high-order aberrations are likely to occur because the negative power of the front lens group must be maintained, and so the image-forming capability of the lens system cannot be maintained over a wide range of field angle.

Deviations from the upper limit of −0.7 and the lower limit of −2.5 in condition (I-2) cause coma to become worse. Any deviation from the lower limit has a particularly adverse influence on high-order chromatic aberrations of magnification, and distortion, whereas any deviation from the upper limit has an especially adverse influence on astigmatism.

In the present invention, it is to be noted that there is the precondition needed to achieve the constructional action and effect or, in another parlance, to achieve such an optical system for digital cameras as mentioned above. That is, there is the precondition needed to process and fabricate lens component elements or make sure of edge thicknesses thereof, and given by $$0.25 < d_1/f < 0.8 \tag{I-3}$$

where $d_1$ is the optical axis thickness of the positive lens located nearest to the object side of the system.

When the lower limit of 0.25 in condition (I-3) is not reached, lens processing becomes difficult due to a failure in making sure of sufficient edge thickness of the lens. When the upper limit of 0.8 is exceeded, on the other hand, lens diameter increases as is often the case with lens systems using positive lenses as front lens groups.

The lens system of the invention, when designed to be used for digital photography, is required to be a telecentric system as already mentioned, in which the exit pupil is at infinity. In the telecentric system unlike in a conventional wide-angle system for silver halide 35 mm-film cameras, the angles of incidence and emergence of off-axis or oblique rays on and from the lens located nearest to the image side of the system differ largely, and are smaller with respect to the optical axis of the system. In addition, the height of intersection is high relative to the height of axial marginal rays and the focal length of the system, thus making aberrations likely to occur. To minimize aberrations with respect to the off-axis rays, it is required to reduce the angles of incidence and emergence, respectively. To this end it is necessary to use a double-convex lens for the lens located nearest to the image side of the system. It is then desired that the focal length and shape factor of that double-convex lens be defined by $$1.4 < f_R/f < 3 \tag{I-4}$$

$$-0.5 < (r_{R1} + r_{R2})/(r_{R1} - r_{R2}) < 0.5 \tag{I-5}$$

where $f_R$, $r_{R1}$, and $r_{R2}$ are the focal length of the double-convex lens located nearest to the image side of the system, the radius of curvature or an object-side surface thereof, and the radius of curvature of an image-side surface thereof, respectively.

Deviations from the upper and lower limits of these ranges render it difficult to correct aberrations with respect to of both axial and off-axis rays (especially spherical aberration, coma, and astigmatism). More preferably, condition (I-5) is reduced to $$-0.1 < (r_{R1} + r_{R2})/(r_{R1} - r_{R2}) < 0.4 \tag{I-5'}$$

It is to be noted that there is the precondition needed to achieve the constructional action and effect of the invention or, in another parlance, to realize such an optical system for digital cameras as mentioned above. That is, there is the precondition needed to process and fabricate lens component elements or make sure of edge thicknesses thereof, and given by $$0.5 < d_R/f < 1 \tag{I-6}$$

where $d_R$ is the optical axis thickness of the double-convex lens located nearest to the image side of the system.

With the lower limit of 0.5 in condition (I-6) not reached, lens processing becomes difficult due to a failure in making sure of satisfactory edge thickness. With the upper limit of 1 exceeded, on the other hand, lens diameter is likely to increase, and difficulty is involved in making sure of a given back focus as well.

As already noted, the height of intersection of off-axis rays with the lens located nearest to the image side of the system is high relative to the height of axial marginal rays and the focal length of the system, and the power of this lens element is large as well, thus rendering aberrations likely to occur. To reduce aberrations with respect to the off-axis rays to the smallest possible amount, it is desired that the lens element be shaped such that both the angles of incidence and emergency become small. Only by use of this, however, it is impossible to accommodate to the case where fine pixel pitches and high resolution are needed. To effect a compromise between making sure of the power of the rear lens groups and making correction for aberrations, one may have recourse to conventional methods of increasing the number of positive lenses. As already mentioned, however, there is no extra room besides the space for achieving compactness and a given back focus. To make satisfactory correction for aberrations with no increase in the number of lenses, an aspheric surface is introduced in the double-convex lens located nearest to the image side of the system while it is in opposition to the object side of the system. This lens design is particularly effective for making correction for both axis and off-axis aberrations, and renders lens processing easy as well. Referring to the latter reason in particular, it is preferable that the ratio of the effective diameter of the aspheric surface to product diameter is as small as possible; however, intentional product diameter increases lead to the need of increasing lens thickness due to insufficient edge thickness. This is unfavorable as can be seen from the arguments so for set forth herein. Since this lens is larger in effective diameter on the image side than on the object side, on the other hand, the product diameter is determined depending on considerations on the image side. Thus, it is easy, and preferable, to reduce the ratio of the effective diameter of the aspheric surface to the product diameter.

$$0.5 < D_{SR1}/f < 3 \tag{I-7}$$

$$0.2 < (D_{SR2} - D_{SR1})/D_{SR1} < 3 \tag{I-0}$$

Here $D_{SR1}$ is the distance between the object-side surface of the double-convex lens located nearest to the image side of the system and the aperture stop, and $D_{SR2}$ is the distance between the image-side surface of the double-convex lens located nearest to the image side of the system and the aperture stop.

Condition (I-7) gives a definition of the distance between the aspheric surface and the stop. Any deviation from the lower limit of 0.5 is not preferable because the effect of the aspheric surface on correction of aberrations becomes unacceptably slender. With the upper limit of 3 exceeded, it is difficult to make sure of a given back focus. Condition (I-8) defines that the difference between the distance from the (object-side) aspheric surface of the lens located nearest to the image side to the stop and the distance from the image-side surface thereof to the stop is divided by the distance from the (object-side) aspheric surface to the stop. Any deviation from the lower limit of 0.2 is not preferable because the difference in effective diameter between both the surfaces is too small to reduce the ratio of the effective diameter of the aspheric surface to the product diameter or, there is no choice all but to increase the product diameter so as to make that ratio small. With the upper limit of 3 exceeded, difficulty is experienced in making sure of a given back focus. It is here to be noted that the image-side surface of this lens, too, may assume an aspheric shape.

A negative lens element is needed for the front lens group, because of having negative refracting power, and is positioned between the positive meniscus lens located nearest to the object side of the system and the aperture stop. This negative lens, because of having relatively large power, has a significant influence on off-axis aberrations. It is thus required to minimize aberrations with respect to off-axis rays by making the angles of incidence and emergence small, respectively. Required for this reason is at least a negative meniscus lens having a strong concave surface directed to the image side of the system. On the other hand, it is particularly difficult to make correction for both chromatic aberration and curvature of field throughout the lens system, because this lens system is a system having some thickness with respect to the focal length thereof and is composed of a reduced number of component elements. Especially to achieve simultaneous correction for curvature of field and chromatic aberration, it is desired that the positive lens of the rear lens group be high in terms of both refractive index and Abbe's number and the negative lens be contrary to this. However, no practical glass capable of meeting such requirements exists in the art. For the front lens group, on the other hand, it is desired that the positive lens thereof be low in terms of refractive index and Abbe's number and the negative lens thereof be contrary to this. Thus, this lens group may be achievable by use of a combination of available vitreous materials. That is, $$0.2 < n_1 - n_2 < 0.45 \quad (I-9)$$

$$10 < v_2 - v_1 < 60 \quad (I-10)$$

$$0.5 < D_{2S}/f < 1.5 \quad (I-11)$$

Here $n_1$ and $v_1$ are the refractive index and Abbe's number of the medium of the positive lens located nearest to the object side of the system, respectively; $n_2$ and $v_2$ are the refractive index and Abbe's number of the medium of the negative meniscus lens having a strong concave surface directed to the image side of the system, respectively; and $D_{2S}$ is the distance between the surface of the negative meniscus lens nearest to the image side of the system and the aperture stop.

Conditions (I-9) and (I-10) give definitions of the refractive indices and Abbe's numbers of the two lenses forming the front lens group. With the upper limits not reached, no sufficient correction of curvature of field and chromatic aberration is achievable. With the upper limits exceeded, on the other hand, no practical vitreous material is available. It is here to be noted that for the front lens group smaller in power than the rear lens group it is easy to make sure of edge thickness even when there is some diameter increase. It is thus required that a stop surface or a surface (member) that determines axial marginal rays be as close to the rear lens group as possible, so that a member associated with the stop or the like is inserted in front of the stop, and so it is required to make sure of an acceptable space to this end.

Condition (I-11) gives a definition of the distance between the surface of the negative meniscus lens located nearest to the image side of the system and the stop. This is, so to speak, the precondition needed for achieving the constructional action and effect of the invention or, in another parlance, the precondition needed to realize such an optical system for digital cameras as mentioned above. In other words, this is the precondition needed for lens construction, i.e., for making sure of a space sufficient to accommodate to the insertion of the stop and other associated member. Any deviation from the lower limit of 0.5 is not preferable, partly because no space sufficient to accommodate to the insertion of the stop or other associated member is available, and partly because not only are the principal points of the front and rear lens groups too close to each other but also the powers of both the lens groups needed for making sure of a given back focus are likely to become too large. With the upper limit of 1.5 exceeded, the diameter of the front lens group is likely to become large.

When only one negative meniscus lens having a strong concave surface directed to the image side of the system is used, its image-side surface of large curvature takes a major part in the power of the front lens group. To minimize its influence on off-axis aberrations, it is thus preferable to make its center of curvature as close to the point of intersection of the stop surface with the optical axis of the system as possible. That is, $$0.3 < r_{22}/f < 1 \quad (I-12)$$

Here $r_{22}$ is the radius of curvature of the surface of the negative meniscus lens located nearest to the image side of the system.

With the lower limit of 0.3 in this condition not reached, off-axis aberrations become worse. In addition, the meniscus lens assumes a concave surface shape like a hemisphere, and so is difficult to process. With the upper limit of 1 exceeded, the negative power of the front lens group cannot be maintained.

It is preferable that the rear lens group consisting of one positive lens and one negative lens is positioned between the stop and the double-convex lens located nearest to the image side of the system in view of the power, image-forming capability, back focus, and reduced diameter of the system, and that the following condition is satisfied.

$$2 < (D_{S41} + D_{S42} + D_{SR1} + D_{SR2})/2(D_{S31} + D_{S32}) < 10 \quad (I-13)$$

Here $D_{S31}$, $D_{S32}$, $D_{S41}$, and $D_{S42}$ are the distances between the aperture stop, and the object- and image-side surfaces of the negative lens, and the object- and image-side surfaces of the positive lens, respectively; $D_{SR1}$ is the distance between the object-side surface of the double-convex lens located nearest to the image side of the system and the aperture stop; and $D_{SR2}$ is the distance between the image-side surface of the double-convex lens located nearest to the image side of the system and the aperture stop.

Condition (I-13) gives a definition of the ratio between an average value of the distance from the converging surface to the stop and the distance from the diverging surface to the stop. To make the system telecentric on the emergent side is achievable by bringing the front focal position of the rear lens group in coincidence with the stop position. Any deviation from the lower limit of 2 in this condition causes the front focal position of the rear lens group to be spaced away from the stop position toward the object side of the system, and so renders it difficult to make the system telecentric on the emergent side. Any deviation from the upper limit of 10 is not preferable because it is again difficult to make the system telecentric on the emergent side, and because the required effective diameter of the positive lens located nearest to the image side of the system becomes too large.

Referring here to a structure between the stop and the double-convex lens located nearest to the image side of the system, it is preferable that the negative, and positive lenses are cemented together in the described order, as viewed from the object side of the system, from the standpoints of making sure of the length of a given back focus, making correction for aberrations (esp., chromatic aberration, Petzval's sum, spherical aberration, and coma), and the system-constructing capability. In view of correcting spherical aberration, it is required to make use of a surface enabling axial rays to have relatively large height and having a concave surface directed toward the object side. When it is intended to reduce off-axis aberrations inclusive of coma as much as possible, on the other hand, it is preferable to reduce the angle of incidence of off axis rays on that surface or, in another parlance, bring the center of curvature close to a pupil image point. To effect a reasonable compromise between them, it is preferable that the surface of the rear lens group located nearest to the object side of the system is made up of a concave surface. If this is the case, it is then preferable to construct the rear lens group from a negative lens located nearest to the object side of the system and a positive lens located adjacent thereto. It is here to be understood that since this location order renders it difficult to correct chromatic aberration of magnification, it is required to increase the powers of the two elements by all means. It is thus preferable that both the elements are cemented together with a reduced radius of curvature of the cemented surface. That is, $$1 < r_{41}/f < 4 \tag{I-14}$$

Here $r_{41}$ is the radius of curvature of the object-side surface of the positive lens.

Any deviation from the upper limit of 4 in this condition (I-14) renders correction of chromatic aberration of magnification difficult, and any deviation from the lower limit of 1 is not preferable because the edge thickness of the positive lens becomes insufficient. Since the refractive index of the negative lens is increased so as to ensure the effect of that cemented surface on correction of spherical aberration, on the other hand, a problem arises; the Petzval's sum tends to increase. It is thus preferable to reduce the difference in refractive index between both the lenses as much as possible. That is, $$0 < n_3 - n_4 < 0.2 \tag{I-15}$$

Here $n_3$, and $n_4$ are the refractive indices of the media of the negative, and positive lenses, respectively.

Any deviation from the upper limit of 0.2 in this condition (I-15) causes the Petzval's sum to become too large, and any deviation from the lower limit of 0 results in under-correction of spherical aberration. Preferably, the refractive indices themselves of the lenses are high because they are composed of a reduced number of lenses.

$$1.6 < n_4 < 1.85 \tag{I-16}$$

With the upper limit of 1.85 exceeded, no practical vitreous material exists, and with the lower limit of 1.6 not reached, the curvature of the lens becomes too large to make sure of the edge thickness thereof.

It is here to be understood that since the absolute size of the lens system is very small, difficulty is involved in making sure of a space assigned to a lens barrel sit where lenses are fixed between the stop and the concave surface of the rear lens group located nearest to the object side of the system. Since the diameter of the positive lens becomes larger by reason of the height of off-axis rays, it is preferable that the positive lens is fixed on both its sides with negative lenses of smaller diameter. This is applicable only to a combination of a positive lens with negative lenses of much smaller diameter. It follows that a specific condition must be provided to make the effective diameter of the image-side surface of the negative lens significantly smaller than that of the image-side surface of the positive lens. That is, it is desired that $$0.5 < (D_{S42} - D_{S41})/D_{S41} < 4 \tag{I-17}$$

be satisfied. With the lower limit of 0.5 not reached, the difference in effective diameter between the image-side surface of the negative lens and the positive lens becomes too small to fix only the positive lens to the barrel. Any deviation from the upper limit of 4 is not preferable because the thickness of the positive lens becomes large, and because the diameter of the lens located nearest to the image side of the system becomes too large.

Furthermore, it is preferable to satisfy the following conditions:

$$-5 < f_N/f < -1.5 \tag{I-18}$$

$$0.7 < f_P/f < 2 \tag{I-19}$$

$$1 < D_{FS}/f < 3 \tag{I-20}$$

$$1 < D_{SR}/f < 5 \tag{I-21}$$

where $f_N$, and $f_P$ are the composite focal lengths of the negative, and positive lens groups, respectively; $D_{FS}$ is the distance between the surface nearest to the object side of the system and the aperture stop; and $D_{SR}$ is the distance between the aperture stop and the surface nearest to the image side of the system.

Conditions (I-18) to (I-21) are provided to place an image pickup lens system having a focal length as short as a few millimeters and so having a very small absolute size in a well-balanced state concerning size, the system-constructing capability, and the barrel-mounting capability. These parameters are generally larger compared with those of an optical system having a longer focal length. Any deviation from the lower limits in these conditions causes lens diameter, and air separation to become too small to design and construct a lens barrel. With the upper limits exceeded, the optical system becomes large.

It is here to be understood that throughout the invention the aforesaid conditions (I-1) to (I-21) are preferably reduced to:

$$3.5 < f_1/f < 5 \quad \text{(I-1)}'$$

a4

$$0.3 < d_1/f < 0.8 \quad \text{(I-3)}'$$

$$1.5 < f_R/f < 2.5 \quad \text{(I-4)}'$$

$$-0.3 < (r_{R1}+r_{R2})/(r_{R1}-r_{R2}) < 0.3 \quad \text{(I-5)}'$$

$$0.6 < d_n/f < 1 \quad \text{(I-6)}'$$

$$0.8 < D_{SR1}/f < 2 \quad \text{(I-7)}'$$

$$0.5 < (D_{SR2}-D_{SR1})/D_{SR1} < 2 \quad \text{(I-8)}'$$

$$0.3 < n_1-n_2 < 0.45 \quad \text{(I-9)}'$$

$$35 < v_2-v_1 < 60 \quad \text{(I-10)}'$$

$$0.6 < D_{2S}/f < 1.3 \quad \text{(I-11)}'$$

$$0.4 < r_{22}/f < 0.8 \quad \text{(I-12)}'$$

$$2.5 < (D_{341}+D_{342}+D_{SR1}+D_{SR2})/2(D_{S31}+D_{S32}) < 7 \quad \text{(I-13)}'$$

$$1.4 < l_{41}/f < 3.5 \quad \text{(I-14)}'$$

$$0.03 < n_2-n_4 < 0.17 \quad \text{(I-15)}'$$

$$1.65 < n_4 < 1.8 \quad \text{(I-16)}'$$

$$1 < (D_{S42}-D_{S41})/D_{S41} < 3 \quad \text{(I-17)}'$$

$$-4 < f_N/f < -1.5 \quad \text{(I-18)}'$$

$$0.7 < f_P/f < 1.8 \quad \text{(I-19)}'$$

$$1 < D_{FS}/f < 2.5 \quad \text{(I-20)}'$$

$$1.2 < D_{SR}/f < 4 \quad \text{(I-21)}'$$

Most preferably, the aforesaid conditions (I-1) to (I-21) are reduced to:

$$3.8 < f_1/f < 4.7 \quad \text{(I-1)}''$$

a5

$$0.3 < d_1/f < 0.6 \quad \text{(I-3)}''$$

$$1.6 < f_R/f < 2.1 \quad \text{(I-4)}''$$

$$-0.25 < (r_{R1}+r_{R2})/(r_{R1}-r_{R2}) < 0.25 \quad \text{(I-5)}''$$

$$0.65 < d_R/f < 0.85 \quad \text{(I-6)}''$$

$$1.0 < D_{SR1}/f < 1.7 \quad \text{(I-7)}''$$

$$0.6 < (D_{SR2}-D_{SR1})/D_{SR1} < 1.5 \quad \text{(I-8)}''$$

$$0.3 < n_1-n_2 < 0.4 \quad \text{(I-9)}''$$

$$40 < v_2-v_1 < 60 \quad \text{(I-10)}''$$

$$0.7 < D_{2S}/f < 1.1 \quad \text{(I-11)}''$$

$$0.45 < r_{22}/f < 0.65 \quad \text{(I-12)}''$$

$$3.2 < (D_{S41}+D_{S42}+D_{SR1}+D_{SR2})/2(D_{S31}+D_{S32}) < 4.5 \quad \text{(I-13)}''$$

$$1.8 < r_{41}/f < 2.5 \quad \text{(I-14)}''$$

$$0.07 < n_3-n_4 < 0.15 \quad \text{(I-15)}''$$

$$1.67 < n_4 < 1.78 \quad \text{(I-16)}''$$

$$1.4 < (D_{S42}-D_{S41})/D_{S41} < 2.4 \quad \text{(I-17)}''$$

$$-3.5 < f_N/f < -1.8 \quad \text{(I-18)}''$$

$$0.9 < f_P/f < 1.5 \quad \text{(I-19)}''$$

$$1.2 < D_{FS}/f < 1.8 \quad \text{(I-20)}''$$

$$1.6 < D_{SR}/f < 2.8 \quad \text{(I-21)}''$$

The second embodiment of the invention will now be explained.

Condition (II-1) gives a definition of the focal length of the front lens group. Deviations from the lower and upper limits are not preferable because no sufficient back focus is obtained in the former case and distortion becomes significantly worse in the latter case.

Condition (II-2) gives a definition of the ratio between the distance from the aperture stop to a surface vertex of the front lens group nearest to the object side of the system and the distance from the aperture stop to a surface vertex of the rear lens group nearest to the image side of the system, and is provided to make the lens system telecentric on the emergent side while the overall length of the lens system and the diameter of the front lens are kept short.

With the upper limit in condition (II-2) exceeded, the overall length of the system or the diameter of the front lens becomes large or, alternatively, it is impossible to make the lens system telecentric on the emergent side. With the lower limit in condition (II-2) not reached, the height of off-axis rays through the rear lens group becomes large, or correction of off-axis aberrations becomes difficult, or the diameter of the rear lens group becomes large.

Condition (II-3) gives a definition of the distance from the aperture stop to a surface vertex of the rear lens group nearest to the image side of the system. The lens system of the invention has a focal length as short as a few millimeters, and so has a very small absolute size. It is this condition (II-3) that is provided to place such an image pickup lens system in a well-balanced state concerning the size thereof, the system-constructing capability, and the lens barrel-mounting capability. This condition is more important for the lens system having a short focal length than for an optical system having a longer focal length.

With the lower limit in this condition (II-3) not reached, lens diameter or air separation becomes too small to design and construct a lens barrel. With the upper limit of condition (II-3) exceeded, the optical system becomes large.

Condition (II-4) is provided to impose an additional limitation on the shape of the double-convex form of lens component of the rear lens group located nearest to the image side of the system, so that aberrations can be well corrected while the lens system is made telecentric on the emergent side. With the lens system made telecentric on the emergent side, the angle of inclination of principal rays becomes small. It is thus desired that the shape factor have a negative value when compared with that of a conventional wide-angle lens system for silver halide 35 mm-film (Leica size) cameras. To reduce aberrations due to principal rays, it is preferable that this lens component has a shape factor in the vicinity of −0.7. In view of spherical aberration, it is also again preferable that the shape factor lies in the vicinity of −0.7, because axial rays become substantially afocal upon incidence on the lens component. For a lens system designed to have an angle of field of about 30° and an F-number of about 2.8, it is preferable that this shape factor lies substantially in the vicinity of 0 in view of aberrational balances. With the upper limit in condition (II-4) exceeded, spherical aberration is likely to be undercorrected, and with the lower limit not reached, astigmatism, coma, and barrel distortion are likely to occur.

In the lens system of the invention constructed as mentioned above, it is more preferable to satisfy the following conditions (II-1-1), (II-2-1), (II-3-1), and (II-4-1) in place of the aforesaid conditions (II-1), (II-2), (II-3), and (II-4).

$$-0.45 < f/f_F < -0.2 \tag{II-1-1}$$

$$0.4 < D_{FS}/D_{SR} < 1.0 \tag{II-2-1}$$

$$1.5 < D_{SR}/f < 4 \tag{II-3-1}$$

$$-0.3 < (r_{R1}+r_{R2})/(r_{R1}-r_{R2}) < 0.3 \tag{II-4-1}$$

In the lens system of the invention, it is most preferable to satisfy the following conditions (II-1-2), (II-2-2), (II-3-2), and (II-4-2) in place of the aforesaid conditions (II-1), (II-2), (II-3), and (II-4).

$$-0.4 < f/f_F < -0.2 \tag{II-1-2}$$

$$0.6 < D_{FS}/D_{SR} < 0.8 \tag{II-2-2}$$

$$1.5 < D_{SR}/f < 3 \tag{II-3-2}$$

$$-0.2 < (r_{R1}+r_{R2})/(r_{R1}-r_{R2}) < 0.2 \tag{II-4-2}$$

A lens system in which the negative front lens group is made up of, in order from the object side thereof, a positive meniscus lens and a negative meniscus lens having a strong concave surface directed to the image side, two lenses in all, and which complies with the aforesaid conditions (II-1), (II-2), (II-3), and (II-4), too, is capable of achieving the abject of the invention.

In the aforesaid lens system, it is more preferable to satisfy conditions (II-1-1), (II-2-1), (II-3-1), and (II-4-1) in place of conditions (II-1), (II-2), (II-3), and (II-4).

In the aforesaid lens system, it is most preferable to satisfy conditions (II-1-2), (II-2-2), (II-3-2), and (II-4-2) in place of conditions (II-1), (II-2), (II-3), and (II-4).

A lens system of the invention comprising a negative front lens group, a stop, and a positive rear lens group, in which the front lens group is made up of one negative meniscus lens that has on the object side an aspheric surface becoming stronger in curvature further and further off the optical axis of the system and a strong concave surface directed to the image side of the system, and which satisfies the following conditions (II-1-3), (II-2-3), (II-3), and (II-4), too, is capable of achieving the object of the invention.

$$-0.65 < f/f_F < -0.2 \tag{II-1-3}$$

$$0.1 < D_{FS}/D_{SR} < 1.0 \tag{II-2-3}$$

$$1.5 < D_{SR}/f < 5 \tag{II-3}$$

$$-0.5 < (r_{R1}+r_{R2})/(r_{R1}-r_{R2}) < 0.5 \tag{II-4}$$

In the aforesaid lens system, too, the rear lens group is constructed as mentioned above.

In the aforesaid lens system, it is more preferable to satisfy the following conditions (II-1-4), (II-2-4), (II-3-1), and (II-4-1) in place of conditions (II-1-3), (II-2-3), (II-3), and (II-4).

$$-0.65 < f/f_F < -0.4 \tag{II-1-4}$$

$$0.15 < D_{FS}/D_{SR} < 0.7 \tag{II-2-4}$$

$$1.5 < D_{SR}/f < 4 \tag{II-3-1}$$

$$-0.3 < (r_{R1}+r_{R2})/(r_{R1}-r_{R2}) < 0.3 \tag{II-4-1}$$

In the aforesaid lens system, it is most preferable to satisfy the following conditions (II-1-5), (II-2-5), (II-3-2), and (II-4-2) in place of conditions (II-1-3), (II-2-3), (II-3), and (II-4).

$$-0.65 < f/f_F < 0.5 \tag{II-1-5}$$

$$0.25 < D_{FS}/D_{SR} < 0.5 \tag{II-2-5}$$

$$1.5 < D_{SR}/f < 3 \tag{II-3-2}$$

$$-0.2 < (r_{R1}+r_{R2})/(r_{R1}-r_{R2}) < 0.2 \tag{II-4-2}$$

In the lens system of the invention wherein the aforesaid front lens group is made up of one negative meniscus lens, too, the rear lens group is constructed as mentioned above.

A lens system of the invention comprising a negative front lens group, a stop, and a positive rear lens group, in which the front lens group is made up of, in order from the object side of the system, a negative meniscus lens having a strong concave surface directed to the image side of the system and a positive lens, two lenses in all, and which satisfies the following conditions (II-1-6), (II-2-6), (II- 3), (II-4), and (II-5), too, is capable of achieving the object of the invention.

$$-0.2 < f/f_F < 0.3 \tag{II-1-6}$$

$$0.3 < D_{FS}/D_{SR} < 1.6 \tag{II-2-6}$$

$$1.5 < D_{SR}/f < 5 \tag{II-3}$$

$$-0.5 < (r_{R1}+r_{R2})/(r_{R1}-r_{R2}) < 0.5 \tag{II-4}$$

$$0.1 < D_{12}/D_{FS} < 0.7 \tag{II-5}$$

where $D_{12}$ is the axial air separation between the negative meniscus lens of the front lens group having a strong concave surface directed to the image side of the system and the positive lens thereof.

In the aforesaid lens system, it is more preferable to satisfy the following conditions (II-1-7), (II-2-7), (II-3-1), (II-4-3), and (II-5-1) instead of conditions (II-1-6), (II-2-6), (II-3), (II-4), and (II-5).

$$0.0 < f/f_F < 0.25 \tag{II-1-7}$$

$$0.5 < D_{FS}/D_{SR} < 1.4 \tag{II-2-7}$$

$$1.5 < D_{SR}/f < 4 \tag{II-3-1}$$

$$-0.4 < (r_{R1}+r_{R2})/(r_{R1}-r_{R2}) < 0.4 \tag{II-4-3}$$

$$0.2 < D_{12}/D_{FS} < 0.6 \tag{II-5-1}$$

In the aforesaid lens system, it is most preferable to satisfy the following conditions (II-1-8), (II-2-8), (II-3-2), (II-4-1), and (II-5-3) instead of conditions (II-1-6), (II-2-6), (II-3), (II-4), and (II-5).

$$0.1 < f/f_r < 0.25 \quad \text{(II-1-8)}$$

$$0.8 < D_{FS}/D_{SR} < 1.2 \quad \text{(II-2-8)}$$

$$1.5 < D_{SR}/f < 3 \quad \text{(II-3-2)}$$

$$-0.3 < (r_{R1}+r_{R2})/(r_{R1}-r_{R2}) < 0.3 \quad \text{(II-4-1)}$$

$$0.3 < D_{12}/D_{FS} < 0.5 \quad \text{(II-5-3)}$$

When the front lens group is constructed from a negative meniscus lens having a strong concave surface directed to the image side of the system and a positive lens, in order from the object side of the system as mentioned above, it is desired than an optical axis air separation between these lenses be designed to conform to condition (II-5).

When the front lens group is constructed as mentioned just above, barrel distortion is likely to occur. However, if the air separation $D_{12}$ between the negative meniscus lens having a strong concave surface directed to the image side of the system and the positive lens stronger in curvature on the image side of the system than on the object side of the system is smaller than the distance $D_{FS}$ from the surface vertex of the font lens group nearest to the object side to the aperture stop, it is then possible to reduce the amount of the barrel distortion produced.

Any deviation from the upper limit of 0.7 in condition (II-5) is not only preferable for the lens system to make sure of a given back focus with no difficulty but also desirable for correction of spherical aberration, coma, and astigmatism due to the alleviation of burdens on the lenses of the rear lens group. At more than 0.7, however, barrel distortion is likely to occur. When the lower limit of 0.5 in condition (II-5) is not reached, it is impossible to achieve any practical lens system.

According to the lens system of the invention wherein the front lens group is smaller in power than the rear lens group, it is easy to make sure of the edge thickness of the front lens group even though it is of comparatively large diameter. It is thus described that the stop surface or the surface (member) that determines axial marginal rays be located as closely to the rear lens group as possible, thereby locating a member associated with the stop in front of the stop. It is therefore required that a certain space be provided in front of the stop; that is, it is desired to comply with the following condition (II-6):

$$0.5 < D_{2S}/f < 1.5 \quad \text{(II-6)}$$

where $D_{2S}$ is the distance from the surface of the front lens group nearest to the image side of the system to the stop.

Condition (II-6) gives a definition of the distance from the surface of the front lens group nearest to the image side of the system to the stop, and is desired for the achievement of the action and effect of the invention, i.e., for a lens system used on digital cameras. In other words, this is the condition needed to make sure of a space for the insertion of the stop or its associated member when the lens system is constructed.

Any deviation from the lower limit in condition (II-6) is not preferable, not only because it is impossible to make sure of a sufficient space for the insertion of the stop, etc., but also because, for the reason that the principal points of the front and rear lens groups are too close to each other, the powers of both the front and rear lens groups are likely to become too strong to make sure of a given back focus. Any deviation from the upper limit in condition (II-6), on the other hand, results in an increase in the diameter of the front lens group.

In the lens system of the invention, when the front lens group is make up of one negative meniscus lens having a strong concave surface directed to the image side of the system, a major refracting surface of the front lens group is defined by its image-side surface of large curvature. To reduce an influence on off-axial rays to the smallest possible degree, it is desired that the center of curvature of that concave surface be located in the vicinity of the point of intersection of the stop with the optical axis of the system. In short, it is desired to comply with the following condition (II-7):

$$0.5 < R/D_{2S} < 1 \quad \text{(II-7)}$$

where R is the radius of curvature of the concave surface of the negative meniscus lens.

When the lower limit in condition (II-7) is not reached, off-axis aberrations are likely to become worse, and the concave surface of the negative meniscus lens assumes a shape like a difficult-to-process hemisphere. At more than the upper limit in condition (II-7) it is impossible to maintain the negative power of the front lens surface.

The height of intersection of off-axis rays with the lens located nearest to the image side of the system is high relative to the height of axial marginal rays and the focal length of the system, and the power of this lens is large as well, thus rendering aberrations likely to occur. To reduce aberrations with respect to the off-axis rays to the smallest possible amount, it is desired to make both the angles of incidence and emergency small. Only by use of this, however, it is impossible to accommodate to the case where fine pixel pitched and high resolution are needed. To effect a compromise between making sure of the power of the rear lens group and making correction for aberrations, one may have recourse to conventional methods of increasing the number of positive lenses. As already mentioned, however, there is no extra room besides the space for achieving compactness and a given back focus. To make satisfactory correction for aberrations with no increase in the number of lenses, an aspheric surface is introduced in the double-convex lens located nearest to the image side of the system while it is in opposition to the object side of the system.

This object-side surface of the lens located nearest to the image side of the system is greatly effective for making correction for both off-axis aberrations and axial aberrations, and is easy to process as well. Referring to the latter easy-to-process capability, it is preferable that the ratio of the effective diameter of the aspheric surface to product diameter is as small as possible. Required to this end is to increase the diameter of the lens. In that case, however, it is required to increase the thickness of the lens due to an insufficient edge thickness, but this is not preferable for making the lens system compact. The diameter of the lens located nearest to the image side of the system (product diameter) is determined while taking account of the fact that its image-side surface is larger in effective diameter than its object-side surface.

With the aforesaid considerations in mind, it is then desired to comply with the following conditions (II-8), and (II-9):

$$0.5 < D_{SR1}/f < 3 \quad \text{(II-8)}$$

$$0.2 < (D_{SR2}-D_{SR1})/D_{SR1} < 3 \quad \text{(II-9)}$$

where $D_{SR1}$, and $D_{SR2}$ are the distance from the stop to the (aspheric) object-, and image-side surfaces of the lens located nearest to the image side of the system, respectively.

Condition (II-8) gives a definition of the distance from the stop to the aspheric surface. Any deviation from the lower limit is not preferable because the effect of the aspheric surface on correction of aberrations becomes inadequate. At more than the upper limit it is difficult to make sure of a given back focus.

Cond. (II-9) defines to divide the difference between the distances from the stop to the (aspheric) object-, and (spherical) image-side surfaces of the lens located nearest to the image side of the system by the distance from the aspheric surface to the stop.

Any deviation from the lower limit in condition (II-9) is not preferable, because there is a small difference in effective diameter between both the surfaces, which renders it difficult to make the ratio of the effective diameter of the aspheric surface to the product diameter small. In other words, that ratio cannot be reduced without increasing the product diameter. At more than the upper limit in condition (II-9) it is difficult to make sure of a given back focus.

Referring to the rear lens group in the lens system of the invention, when the aforesaid double-convex form of lens component located nearest to the image side of the system is a single lens, it is desired in view of the power, image-forming capability, back focus, and diameter reduction of the system that one positive lens and one negative lens be located between the stop and the double-convex lens component. Particularly to make the back focus long, achieve satisfactory correction of various aberrations (esp., chromatic aberration, Petzval's sum, spherical aberration, and coma), and construct the system easily, it is desired that the negative, and positive lenses be cemented together in the described order into a cemented lens. It is also desired to use an optical system having the capability of correcting other chromatic aberration and having positive refracting power. Alternatively, when the double-convex form of lens component located nearest to the image side of the system is a cemented lens, or an optical element having the capability of correcting other chromatic aberration and having positive refracting power, the object of the invention is fully refracting power, the object of the invention if fully achievable by the location of one positive lens between the stop and the double-convex lens component.

In the lens system of the invention, it is more preferable to comply with the following conditions (II-6-1), (II-7-1), (II-8-1), and (II-9-1) instead of the aforesaid conditions (II-6), (II-7), (II-8), and (II-9).

$$0.6 < D_{2S}/f < 1.3 \quad \text{(II-6-1)}$$

$$0.5 < R/D_{2S} < 0.9 \quad \text{(II-7-1)}$$

$$0.8 < D_{SR1}/f < 2 \quad \text{(II-8-1)}$$

$$0.5 < (D_{SR2} - D_{SR1})/D_{SR1} < 2 \quad \text{(II-9-1)}$$

In the lens system of the invention, it is most preferable to conform to the following conditions (II-6-2), (II-7-2), (II-8-2), and (II-9-2) instead of the aforesaid conditions (II-6), (II-7), (II-8), and (II-9).

$$0.7 < D_{2S}/f < 1.2 \quad \text{(II-6-2)}$$

$$0.6 < R/D_{2S} < 0.8 \quad \text{(II-7-2)}$$

$$1.0 < D_{SR1}/f < 1.7 \quad \text{(II-8-2)}$$

$$0.6 < (D_{SR2} - D_{SR1})/D_{SR1} < 1.5 \quad \text{(II-9-2)}$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
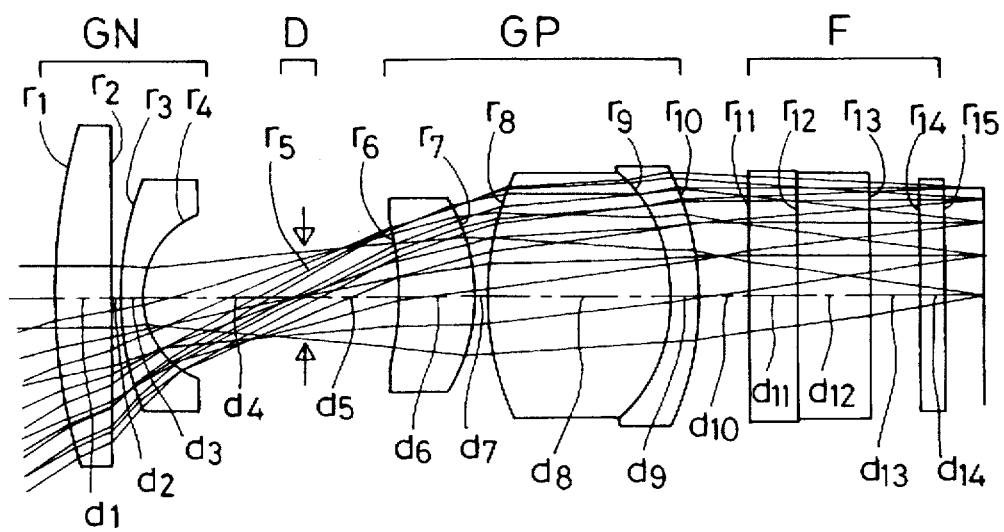
FIG. 1 is a sectional schematic of Example 1 of the wide-angle lens system of the invention.
Figure 2:
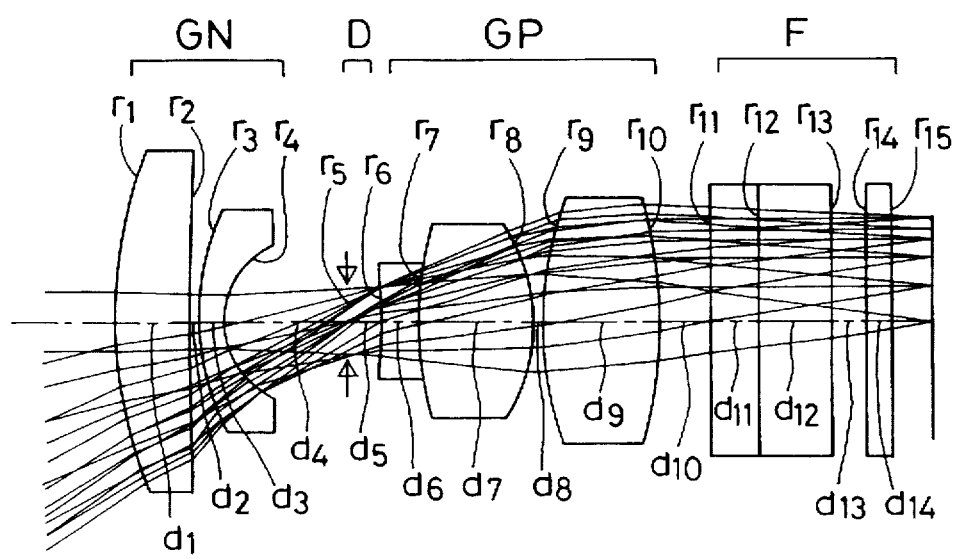
FIG. 2 is a sectional schematic of Example 2 of the wide-angle lens system of the invention.

Examples 1 to 3 of the first embodiment of the invention will first be explained. FIGS. 1 and 2 are sectional schematics of the lens systems according to Examples 1 and 2. A lens layout of Example 3 is similar to that of Example 2, and so is not illustrated.

As shown in the sectional schematic of FIG. 1, the lens system of Example 1 is composed of, in order from an object side thereof, a negative lens group GN, an aperture stop D, a positive lens groups GP, and a parallel-plate group F including a filter, a cover glass or the like. The negative lens group GN consists of a positive meniscus lens having a convex surface directed to the object side of the system, and a negative meniscus lens having a concave surface directed to an image side of the system, and the positive lens group GP consists of a positive nemiscus lens having a convex surface directed to the image side of the system, and a cemented doublet made of a double-convex lens, and a negative meniscus lens having a convex surface directed to the image side of the system. An aspheric surface is used for an image-side surface of the positive meniscus lens in the positive lens group GP.

As shown in the sectional schematic of FIG. 2, each of the lens systems according to Examples 2 and 3 comprises, in order from an object side of the system, a negative lens group GN, an aperture stop D, a positive lens group GP, and a parallel-plate group F including a filter, a cover glass or the like. The negative lens group GN consists of a positive meniscus lens having a convex surface directed to the object side of the system, and a negative meniscus lens having a concave surface directed to an image side of the system, and the positive lens group GP consists of a cemented doublet made up of a double-concave lens and a double-convex lens, and a double-convex lens. An aspheric surface is used for an object-side surface of the double-convex lens located in the positive lens group GP on the image side of the system.

The F-number is 2.79 throughout Examples 1 to 3, the image height is 3.3 in Example 1, 3.0 in Example 2, and 3.0 in Example 3; the focal length (f) of the overall lens system is 5.15 throughout Examples 1 to 3; and the half angle of field (ω) in 32.65° in Example 1, 30.22° in Example 2, and 30.22° ion Example 3.

Enumerated below are numerical data on Examples 1 to 3. Symbols used hereinafter but not hereinbefore are $r_1, r_2$ . . . radii of curvature of the lens surfaces, $d_1, d_2$ . . . separation between adjacent lens surfaces, $n_{d1}, n_{d2}$ . . . d-line refractive indices of lenses, and $v_{d1}, v_{d2}$ . . . Abbe's number of lenses.

Here let x and y represent a direction of propagation of light on the optical axis and a direction perpendicular to the optical axis. The aspheric shape is given by $$x = (y^2/r)/[1+\{1-(y/r)^2\}^{1/2}] + A_4 y^4 + A_6 y^6 + A_8 y^8 + A_{10} y^{10}$$

where r is the paraxial radius of curvature, and $A_4$, $A_6$, $A_8$, and $A_{10}$ are the fourth, sixth, eighth, and tenth-order aspheric surface coefficients, respectively.

Example 1

| | | | |
|---|---|---|---|
| $r_1 = 17.8851$ | $d_1 = 1.8000$ | $n_{d1} = 1.84666$ | $v_{d1} = 23.78$ |
| $r_2 = 336.9061$ | $d_2 = 0.2500$ | | |
| $r_3 = 9.0262$ | $d_3 = 0.7500$ | $n_{d2} = 1.57501$ | $v_{d2} = 41.49$ |
| $r_4 = 2.5636$ | $d_4 = 4.9923$ | | |
| $r_5 = \infty$ (Stop) | $d_5 = 2.8885$ | | |
| $r_6 = -10.6871$ | $d_6 = 2.5116$ | $n_{d3} = 1.56384$ | $v_{d3} = 60.70$ |
| $r_7 = -5.4539$ (Aspheric) | $d_7 = 0.3493$ | | |
| $r_8 = 9.1827$ | $d_8 = 5.7000$ | $n_{d4} = 1.56384$ | $v_{d4} = 60.70$ |
| $r_9 = -4.8522$ | $d_9 = 0.8500$ | $n_{d5} = 1.84666$ | $v_{d5} = 23.78$ |
| $r_{10} = -8.4474$ | $d_{10} = 1.5000$ | | |
| $r_{11} = \infty$ | $d_{11} = 1.6000$ | $n_{d6} = 1.51633$ | $v_{d6} = 64.15$ |
| $r_{12} = \infty$ | $d_{12} = 2.3000$ | $n_{d7} = 1.54771$ | $v_{d7} = 62.84$ |
| $r_{13} = \infty$ | $d_{13} = 1.5000$ | | |
| $r_{14} = \infty$ | $d_{14} = 0.7500$ | $n_{d8} = 1.48749$ | $v_{d8} = 70.21$ |
| $r_{15} = \infty$ | | | |

Aspherical Coefficients
7th surface $A_4 = 2.5592 \times 10^{-6}$
$A_6 = 2.8708 \times 10^{-5}$
$A_8 = 1.0675 \times 10^{-5}$
$A_{10} = -9.2566 \times 10^{-7}$ Example 2

| | | | |
|---|---|---|---|
| $r_1 = 14.7669$ | $d_1 = 2.4000$ | $n_{d1} = 1.84666$ | $v_{d1} = 23.78$ |
| $r_2 = 77.2137$ | $d_2 = 0.2500$ | | |
| $r_3 = 8.6633$ | $d_3 = 0.7500$ | $n_{d2} = 1.48749$ | $v_{d2} = 70.21$ |
| $r_4 = 2.6379$ | $d_4 = 3.8149$ | | |
| $r_5 = \infty$ (Stop) | $d_5 = 1.1000$ | | |
| $r_6 = -9.4638$ | $d_6 = 1.2000$ | $n_{d3} = 1.84666$ | $v_{d3} = 23.78$ |
| $r_7 = 12.0733$ | $d_7 = 3.6000$ | $n_{d4} = 1.72916$ | $v_{d4} = 54.68$ |
| $r_8 = -5.5956$ | $d_8 = 0.1500$ | | |
| $r_9 = 9.4226$ (Aspheric) | $d_9 = 3.8000$ | $n_{d5} = 1.56384$ | $v_{d5} = 60.70$ |
| $r_{10} = -12.3053$ | $d_{10} = 1.5000$ | | |
| $r_{11} = \infty$ | $d_{11} = 1.6000$ | $n_{d6} = 1.51633$ | $v_{d6} = 64.15$ |
| $r_{12} = \infty$ | $d_{12} = 2.3000$ | $n_{d7} = 1.54771$ | $v_{d7} = 62.84$ |
| $r_{13} = \infty$ | $d_{13} = 1.0000$ | | |
| $r_{14} = \infty$ | $d_{14} = 0.7500$ | $n_{d8} = 1.48749$ | $v_{d8} = 70.21$ |
| $r_{15} = \infty$ | | | |

Aspherical Coefficients
9th surface $A_4 = -3.1037 \times 10^{-4}$
$A_6 = -2.4543 \times 10^{-3}$
$A_8 = 2.1418 \times 10^{-6}$
$A_{10} = -7.2117 \times 10^{-8}$ Example 3

| | | | |
|---|---|---|---|
| $r_1 = 14.4595$ | $d_1 = 2.3000$ | $n_{d1} = 1.84666$ | $v_{d1} = 23.78$ |
| $r_2 = 73.2856$ | $d_2 = 0.2500$ | | |
| $r_3 = 8.3092$ | $d_3 = 0.7500$ | $n_{d2} = 1.48749$ | $v_{d2} = 70.21$ |
| $r_4 = 2.6330$ | $d_4 = 3.7620$ | | |
| $r_5 = \infty$ (Stop) | $d_5 = 1.1000$ | | |
| $r_6 = -7.4826$ | $d_6 = 0.8000$ | $n_{d3} = 1.84666$ | $v_{d3} = 23.78$ |
| $r_7 = 10.0000$ | $d_7 = 3.5000$ | $n_{d4} = 1.72916$ | $v_{d4} = 54.68$ |
| $r_8 = -5.5677$ | $d_8 = 0.1500$ | | |
| $r_9 = 10.1428$ (Aspheric) | $d_9 = 3.6000$ | $n_{d5} = 1.56384$ | $v_{d5} = 60.70$ |
| $r_{10} = -8.6705$ | $d_{10} = 1.5000$ | | |
| $r_{11} = \infty$ | $d_{11} = 1.6000$ | $n_{d6} = 1.51633$ | $v_{d6} = 64.15$ |
| $r_{12} = \infty$ | $d_{12} = 2.0200$ | $n_{d7} = 1.54771$ | $v_{d7} = 62.84$ |
| $r_{13} = \infty$ | $d_{13} = 1.6500$ | | |
| $r_{14} = \infty$ | $d_{14} = 0.7500$ | $n_{d8} = 1.48749$ | $v_{d8} = 70.21$ |
| $r_{15} = \infty$ | | | |

Aspherical Coefficients
9th surface $A_4 = -5.5278 \times 10^{-4}$
$A_6 = -2.0032 \times 10^{-5}$
$A_8 = 2.1245 \times 10^{-6}$
$A_{10} = 8.0626 \times 10^{-8}$ Set out below are values for the aforesaid conditions (II-1) to (II-21) in Examples 1 to 3 given above.

| | Example 1 | Example 2 | Example 3 |
|---|---|---|---|
| I-1 | 4.320 | 4.115 | 4.058 |
| I-2 | −1.112 | −1.473 | −1.492 |
| I-3 | 0.3496 | 0.4660 | 0.4466 |
| I-4 | * | 1.961 | 1.729 |
| I-5 | * | −0.1327 | 0.07826 |
| I-6 | * | 0.7378 | 0.6990 |
| I-7 | * | 1.175 | 1.078 |
| I-8 | * | 0.6281 | 0.6486 |
| I-9 | 0.27165 | 0.35917 | 0.35917 |
| I-10 | 17.71 | 46.43 | 46.43 |
| I-11 | 0.9693 | 0.7407 | 0.7305 |
| I-12 | 0.4977 | 0.5122 | 0.5113 |
| I-13 | * | 3.544 | 3.667 |
| I-14 | * | 2.344 | 1.942 |
| I-15 | * | 0.1175 | 0.1175 |
| I-16 | * | 1.72916 | 1.72916 |
| I-17 | * | 1.565 | 1.842 |
| I-18 | −2.039 | −3.180 | −3.324 |
| I-19 | 1.328 | 1.065 | 1.055 |
| I-20 | 1.513 | 1.401 | 1.371 |
| I-21 | 2.388 | 1.918 | 1.777 |

The wide-angle lens system according to the second embodiment of the invention will now be explained with reference to Example 4 to 7.

Examples 4 to 7 of the lens system according to the invention are constructed as shown in FIGS. 3 to 6, and have the following data.

Example 4
f = 5 mm, F/2.8, 2ω = 65.50°

| | | | |
|---|---|---|---|
| $r_1 = 5.3858$(Aspheric) | $d_1 = 0.7500$ | $n_1 = 1.48749$ | $v_1 = 70.21$ |
| $r_2 = 2.2087$ | $d_2 = 3.5240$ | | |
| $r_3 = \infty$ (Stop) | $d_3 = 2.8368$ | | |
| $r_4 = -13.9329$ | $d_4 = 2.2945$ | $n_2 = 1.56384$ | $v_2 = 60.70$ |
| $r_5 = -4.7666$ | $d_5 = 0.3498$ | | |
| $r_6 = 10.7164$(Aspheric) | $d_6 = 5.6388$ | $n_3 = 1.56384$ | $v_3 = 60.70$ |
| $r_7 = -3.9559$ | $d_7 = 0.8500$ | $n_4 = 1.84666$ | $v_4 = 23.78$ |
| $r_8 = -8.1556$ | $d_8 = 1.5000$ | | |
| $r_9 = \infty$ | $d_9 = 1.6000$ | $n_5 = 1.51633$ | $v_5 = 64.15$ |
| $r_{10} = \infty$ | $d_{10} = 2.3000$ | $n_6 = 1.54771$ | $v_5 = 62.84$ |
| $r_{11} = \infty$ | $d_{11} = 1.5000$ | | |
| $r_{12} = \infty$ | $d_{12} = 0.7500$ | $n_7 = 1.48749$ | $v_7 = 70.21$ |
| $r_{13} = \infty$ | $d_{13} = 1.2151$ | | |
| $r_{14} = \infty$(Image) | | | |

Aspherical Coefficients (1st surface)
$K = 0, A_4 = 2.1382 \times 10^{-6}, A_6 = 1.9025 \times 10^{-4}$
$A_8 = -1.0961 \times 10^{-6}, A_{10} = 0$ (6th surface)
$K = 0, A_4 = -1.6237 \times 10^{-4}, A_6 = -1.7816 \times 10^{-5}$
$A_8 = 5.6723 \times 10^{-6}, A_{10} = -1.8854 \times 10^{-9}$ -continued $f/f_F = -0.6165$, $D_{FS}/D_{SB} = 0.3570$, $D_{SB}/f = 2.333$
$(r_{R1} + r_{R2})/(r_{R1} - r_{R2}) = 0.1357$, $D_{2S}/f = 0.6868$
$R/D_{2S} = 0.6268$, $D_{SR1}/f = 1.068$
$(D_{SR2} - D_{SR1})/D_{SR1} = 1.184$ Example 5
f = 5 mm, F/2.8, 2ω = 65.30°

| | | | |
|---|---|---|---|
| $r_1 = 14.7669$ | $d_1 = 2.4000$ | $n_1 = 1.84666$ | $v_1 = 23.78$ |
| $r_2 = 77.2137$ | $d_2 = 0.2500$ | | |
| $r_3 = -8.6633$ | $d_3 = 0.7500$ | $n_2 = 1.48749$ | $v_2 = 70.21$ |
| $r_4 = 2.6379$ | $d_4 = 3.8149$ | | |
| $r_5 = \infty$(Stop) | $d_5 = 1.1000$ | | |
| $r_6 = -9.4638$ | $d_6 = 1.2000$ | $n_3 = 1.84666$ | $v_3 = 23.78$ |
| $r_7 = 12.0733$ | $d_7 = 3.6000$ | $n_4 = 1.72916$ | $v_4 = 54.68$ |
| $r_8 = -5.5956$ | $d_8 = 0.1500$ | | |
| $r_9 = 9.4226$(Aspheric) | $d_9 = 3.8000$ | $n_5 = 1.56384$ | $v_5 = 60.70$ |
| $r_{10} = -12.3053$ | $d_{10} = 1.5000$ | | |
| $r_{11} = \infty$ | $d_{11} = 1.6000$ | $n_6 = 1.51633$ | $v_6 = 64.15$ |
| $r_{12} = \infty$ | $d_{12} = 2.3000$ | $n_7 = 1.54771$ | $v_7 = 62.84$ |
| $r_{13} = \infty$ | $d_{13} = 1.0000$ | | |
| $r_{14} = \infty$ | $d_{14} = 0.7500$ | $n_8 = 1.48749$ | $v_8 = 70.21$ |
| $r_{15} = \infty$ | $d_{15} = 1.1999$ | | |
| $r_{16} = \infty$(Image) | | | |

Aspherical Coefficients $K = 0$, $A_4 = -3.1037 \times 10^{-4}$, $A_6 = -2.4543 \times 10^{-5}$
$A_8 = 2.1418 \times 10^{-6}$, $A_{10} = -7.2117 \times 10^{-8}$
$f/f_F = -0.3145$, $D_{FS}/D_{SR} = 0.7324$, $D_{SR}/f = 1.913$
$(r_{R1} + r_{R2})/(r_{R1} - r_{R2}) = -0.1327$, $D_{2S}/f = 0.7407$
$R/D_{2S} = 0.6914$, $D_{SR1}/f = 1.175$
$(D_{SR2} - D_{SR1})/D_{SR1} = 0.6281$ Example 6
f = 5 mm, F/2.8, 2ω = 65.30°

| | | | |
|---|---|---|---|
| $r_1 = 14.4595$ | $d_1 = 2.3000$ | $n_1 = 1.84666$ | $v_1 = 23.78$ |
| $r_2 = 73.2856$ | $d_2 = 0.2500$ | | |
| $r_3 = 8.3092$ | $d_3 = 0.7500$ | $n_2 = 1.48749$ | $v_2 = 70.21$ |
| $r_4 = 2.6330$ | $d_4 = 3.7620$ | | |
| $r_5 = \infty$(Stop) | $d_5 = 1.1000$ | | |
| $r_6 = -7.4826$ | $d_6 = 0.8000$ | $n_3 = 1.84666$ | $v_3 = 23.78$ |
| $r_7 = 10.0000$ | $d_7 = 3.5000$ | $n_4 = 1.72916$ | $v_4 = 54.68$ |
| $r_8 = -5.5677$ | $d_8 = 0.1500$ | | |
| $r_9 = 10.1428$(Aspheric) | $d_9 = 3.6000$ | $n_5 = 1.56381$ | $v_5 = 60.70$ |
| $r_{10} = -8.6075$ | $d_{10} = 1.5000$ | | |
| $r_{11} = \infty$ | $d_{11} = 1.6000$ | $n_6 = 1.51633$ | $v_6 = 64.15$ |
| $r_{12} = \infty$ | $d_{12} = 2.0200$ | $n_7 = 1.54771$ | $v_7 = 62.84$ |
| $r_{13} = \infty$ | $d_{13} = 1.6500$ | | |
| $r_{14} = \infty$ | $d_{14} = 0.7500$ | $n_8 = 1.48749$ | $v_8 = 70.21$ |
| $r_{15} = \infty$ | $d_{15} = 1.1999$ | | |
| $r_{16} = \infty$(Image) | | | |

Aspherical Coefficients $K = 0$, $A_4 = -5.5278 \times 10^{-4}$, $A_6 = -2.0032 \times 10^{-5}$
$A_8 = 2.1245 \times 10^{-6}$, $A_{10} = -8.0626 \times 10^{-8}$
$f/f_F = -0.3008$, $D_{FS}/D_{SR} = 0.7715$, $D_{SR}/f = 1.777$
$(r_{R1} + r_{R2})/(r_{R1}-r_{R2}) = -0.07826$, $D_{R2}/f = 0.7305$
$R/D_{R2} = 0.6999$, $D_{SR1}/f = 1.078$
$(D_{SR2} - D_{SR1})/D_{SP1} = 0.6486$ Example 7
f = 5 mm, F/2.8, 2ω = 65.48°

| | | | |
|---|---|---|---|
| $r_1 = 12.0488$ | $d_1 = 0.7500$ | $n_1 = 1.51742$ | $v_1 = 52.42$ |
| $r_2 = 3.9076$ | $d_2 = 3.8000$ | | |
| $r_3 = -61.6570$ | $d_3 = 1.9000$ | $n_2 = 1.84666$ | $v_2 = 23.78$ |
| $r_4 = -8.1908$ | $d_4 = 2.3854$ | | |
| $r_5 = \infty$(Stop) | $d_5 = 1.2569$ | | |
| $r_6 = -5.3626$ | $d_6 = 0.8000$ | $n_3 = 1.84666$ | $v_3 = 23.78$ |
| $r_7 = 14.000$ | $d_7 = 3.0000$ | $n_4 = 1.72916$ | $v_4 = 54.68$ |
| $r_8 = -5.5230$ | $d_8 = 0.2000$ | | |
| $r_9 = 17.1996$(Aspheric) | $d_9 = 3.2000$ | $n_5 = 1.56384$ | $v_5 = 60.70$ |
| $r_{10} = -8.2837$ | $d_{10} = 1.5000$ | | |
| $r_{11} = \infty$ | $d_{11} = 1.6000$ | $n_6 = 1.51633$ | $v_6 = 64.15$ |
| $r_{12} = \infty$ | $d_{12} = 2.3000$ | $n_7 = 1.54771$ | $v_7 = 62.84$ |
| $r_{13} = \infty$ | $d_{13} = 1.5000$ | | |
| $r_{14} = \infty$ | $d_{14} = 0.7500$ | $n_8 = 1.48749$ | $v_8 = 70.21$ |

-continued $r_{15} = \infty$     $d_{15} = 1.2140$
$r_{16} = \infty$(Image)

Aspherical Coefficients $K = 0$, $A_4 = -8.110 \times 10^{-4}$, $A_6 = 6.3995 \times 10^{-8}$
$A_8 = -1.6766 \times 10^{-5}$, $A_{10} = 1.1751 \times 10^{-6}$
$f/f_F = 0.2141$, $D_{FS}/D_{SR} = 1.0449$, $D_{SR}/f = 1.648$
$(r_{R1} + r_{R2})/(r_{R1} - r_{R2}) = 0.3499$, $D_{12}/D_{FS} = 0.4301$
$D_{2S}/f = 1.575$, $R/D_{2S} = 0.4833$, $D_{SR1}/f = 1.024$
$(D_{SR2} - D_{SR1})/D_{SR1} = 0.6087$ In the foregoing data, it is to be noted that symbols $r_1$, $r_2$, . . . are the radii of curvature of lens surfaces; $d_1$, $d_2$, . . . are the thicknesses of lenses and the separation between adjacent lenses; $n_1$, $n_2$, . . . are the refractive indices of lenses; and $v_1$, $v_2$, . . . are the Abbe's numbers of lenses.

Figure 3:
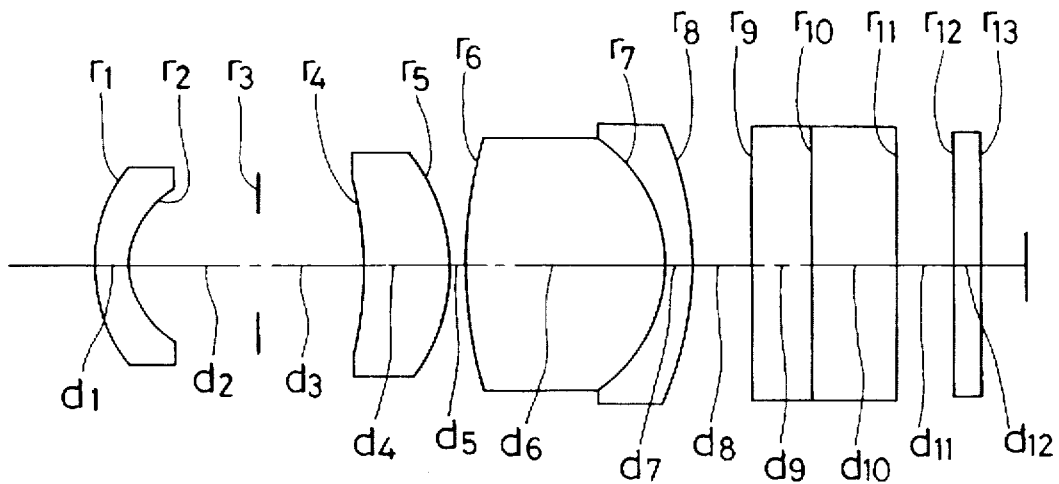
FIG. 3 is a sectional schematic of Example 4 of the wide-angle lens system of the invention.

The lens system of Example 4 is constructed as shown in FIG. 3, and comprises, in order from an object side of the system, a front lens group consisting of one negative meniscus lens having a strong concave surface directed to an image side of the system, an aperture stop, and a rear lens group consisting of a positive meniscus lens, and a double-convex form of lens component located nearest to the image side of the system, which is composed of a positive and a negative lens. An object-side surface ($r_1$) of the negative meniscus lens forming the front lens group is defined by an aspheric surface. An object-side surface of the double-convex lens component forming a part of the rear lens group, i.e., an object-side surface ($r_6$) of the positive lens forming a part of the double-convex lens component is defined by an aspheric surface.

Figure 4:
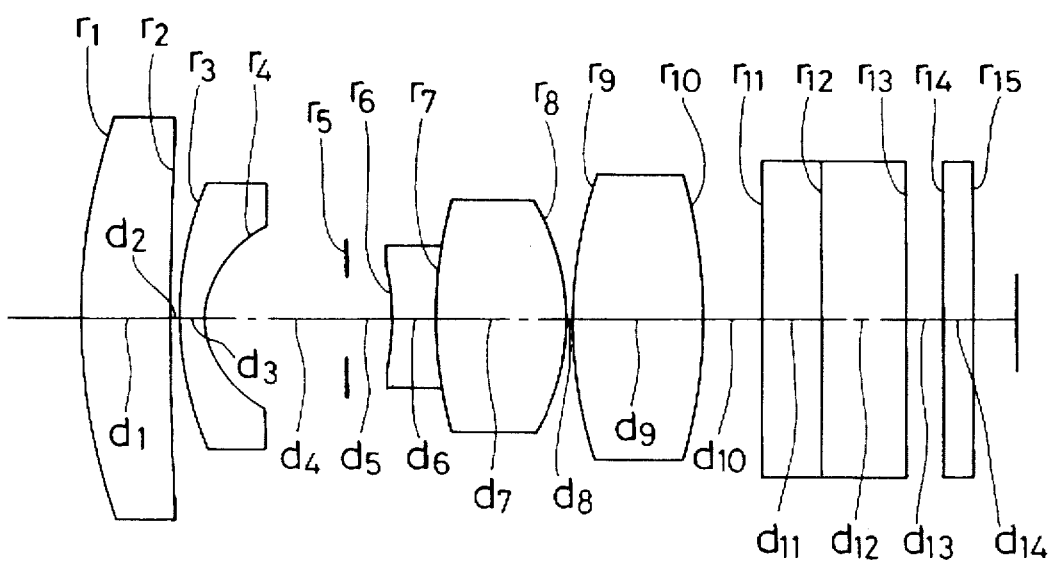
FIG. 4 is a sectional schematic of Example 5 of the wide-angle lens system of the invention.

The lens system of Example 5 is constructed as shown in FIG. 4, and comprises a front lens group consisting of a positive lens larger in power at an object-side surface thereof that at an image-side surface thereof and a negative meniscus lens having a concave surface directed to an image side thereof, and a rear lens group consisting of a cemented lens composed of a negative and a positive lens and a double-convex form of lens component defined by a positive single lens and located nearest to the image side of the system. In Example 5, an object-side surface ($r_g$) of the double-convex forms of the lens component (positive single-lens) located in the rear lens group and nearest to the image side of the system is defined by an aspheric surface.

Figure 5:
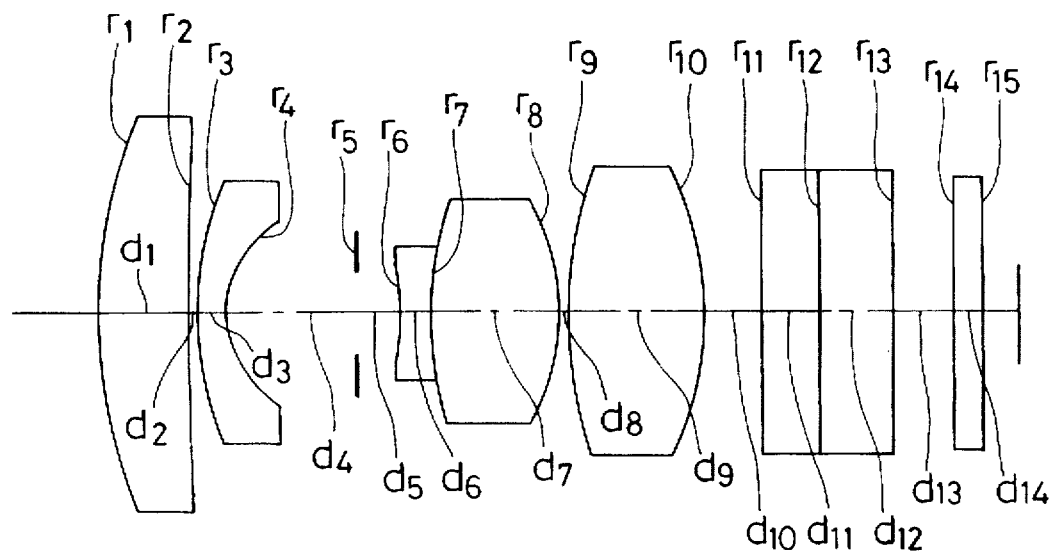
FIG. 5 is a sectional schematic of Example 6 of the wide-angle lens system of the invention.

The lens system of Example 6 is constructed as shown in FIG. 5, and is similar in construction to that of FIG. 5. In Example 6, too, an object-side surface ($r_g$) of the double-convex form of lens component located in the rear lens group and nearest to the image side of the system is defined by an aspheric surface.

Figure 6:
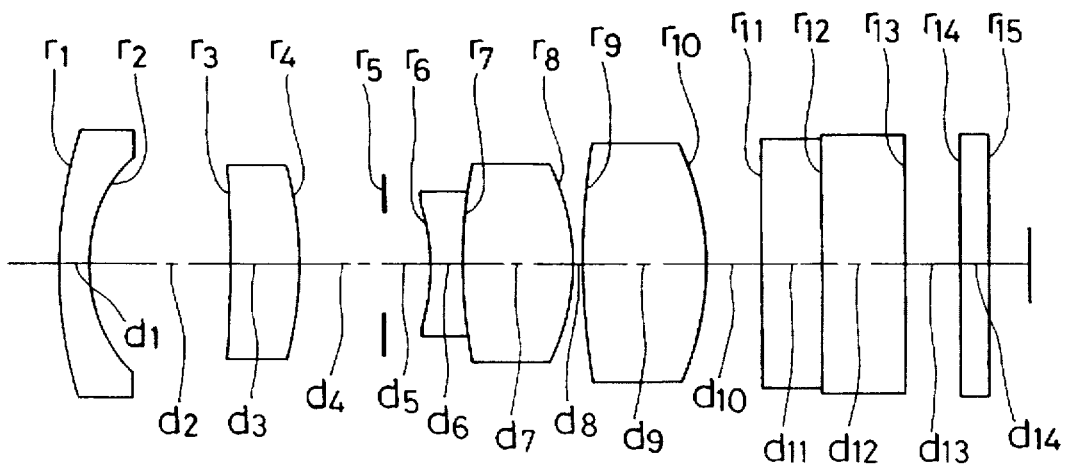
FIG. 6 is a sectional schematic of Example 7 of the wide-angle lens system of the invention.

The lens system of Example 7 is constructed as shown in FIG. 6, and comprises a front lens group consisting of a negative meniscus lens having a concave surface directed to an image side of the system and a positive lens larger in power at an image-side surface than at an object-side surface, and a rear lens group consisting of a cemented lens composed of a negative and a positive lens, and a double-convex form of lens component located nearest to the image side of the system, which is defined by a positive single lens. In Example 76, an object-side surface ($r_g$) of the double-convex form of lens component located in the rear lens group and nearest to the image side of the system is defined by an aspheric surface.

The shape of the aspheric surfaces used in the aforesaid examples is given by $$X=(y^2/r)/|1+\{1-(k+1)(y/r)^2\}^{1/2}|+A_4y^4+A_6y^6+A_8y^8+A_{10}y^{10}$$

where x is a direction of the optical axis of the lens system, y is a direction perpendicular to the optical axis, 4 is the radius of curvature of reference spherical surface, and k, $A_4$, $A_6$, $A_8$, and $A_{10}$ . . . are aspheric surface coefficients.

Throughout the examples, the parallel-plate located between the final surface of the lens system and the image-forming plane includes an infrared ray cut filter, a low-pass filter or other filter.

The wide-angle lens system according to the first embodiment of the invention may be practiced as mentioned in (1) to (11) below, for example.

(1) A wide-angle lens system comprising two lens groups or, in order from an object side of said system, a negative lens group and a positive lens group with an aperture stop midway therebetween, in which a lens nearest to the object side of said system is made up of a positive lens, and which, in terms of power and shape of said positive lens, satisfies the following conditions:

$$2.5 < f_1/f < 10 \quad \text{(I-1)}$$

$$2.5 < (r_1+r_2)/(r_1-r_2) < 0.7 \quad \text{(I-2)}$$

$$0.25 < d_1/f < 0.8 \quad \text{(I-3)}$$

where f is a focal length of the overall lens system, and $f_1$, $r_1$, $r_2$, and $d_1$ are a focal length of said positive lens located nearest to the object side of said system, a radius of curvature of an image-side surface thereof and an optical axis thickness thereof, respectively.

(2) A wide-angle lens system comprising two lens groups or, in order from an object side of said system, a negative lens group and a positive lens group with an aperture stop midway therebetween, in which a lens located nearest to an image side of said system is made up of a double-convex lens, and which, in terms of power and shape of said double-convex lens, satisfies the following conditions:

$$1.4 < f_R/f < 3 \quad \text{(I-4)}$$

$$-0.5 < (r_{R1}+r_{R2})/(r_{R1}-r_{R2}) < 0.5 \quad \text{(I-5)}$$

$$0.5 < d_R/f < 1 \quad \text{(I-6)}$$

where f is a focal length of the overall lens system, and $f_R$, $r_{R1}$, $r_{R2}$, and $d_R$ are a focal length of said double-convex lens located nearest to the image side of said system, a radius of curvature of an object-side surface thereof, and an optical axis thickness thereof, respectively.

(3) A wide-angle lens system comprising two lens groups or, in order from an object side of said system, a negative lens group and a positive lens group with an aperture stop midway therebetween, in which a lens located nearest to the object side of said system is made up of a positive lens and a lens located nearest to an image side of said system i made up of a double-convex lens, and which, in terms of power and shape of said positive, and double-convex lenses, satisfies the following conditions:

$$2.5 < f_1/f < 10 \quad \text{(I-1)}$$

$$1.4 < f_R/f < 3 \quad \text{(I-4)}$$

$$2.5 < (r_1+r_2)/(r_1-r_2) < 0.7 \quad \text{(I-2)}$$

$$-0.5 < (r_{R1}+r_{R2})/(r_{R1}-r_{R2}) < 0.5 \quad \text{(I-5)}$$

$$0.25 < d_1/f < 0.8 \quad \text{(I-3)}$$

$$0.5 < d_R/f < 1 \quad \text{(I-6)}$$

where f is a focal length of the overall lens system; $f_1$, $r_1$, $r_2$, and $d_1$ are a focal length of said positive lens located nearest to the object side of said system, a radius of curvature of an object-side surface thereof, a radius or curvature of an image-side surface thereof, and an optical axis thickness thereof, respectively; and $f_R$, $r_{R1}$, $r_{R2}$, and $d_R$ are a focal length of said double-convex lens located nearest to the image side of said system, a radius of curvature of an object-side surface thereof, a radius of curvature of an image-side surface thereof, and an optical axis thickness thereof, respectively.

(4) The wide-angle lens system according to the aforesaid (2) or (3), in which the object-side surface of the double-convex lens located nearest to the image side of said system is defined by an aspheric surface, and which satisfies the following conditions:

$$0.5 < D_{SR1}/f < 3 \quad \text{(I-7)}$$

$$0.2 < (D_{SR2}-D_{SR1})/D_{SR1} < 3 \quad \text{(I-8)}$$

where $D_{SR1}$ is a distance between the object-side surface of the double-convex lens located nearest to the image side of said system and the aperture stop, and $D_{SR2}$ is a distance between the image-side surface of the double-convex lens located nearest to the image side of said system and the aperture stop.

(5) The wide-angle lens system according to the aforesaid (4), in which the image-side surface of the double-convex lens located nearest to the image side of said system is defined by a spherical surface.

(6) The wide-angle lens system according to the aforesaid (1) or (3), which includes at least a negative meniscus lens having a strong concave surface directed to the image side of said system between the positive lens located nearest to the object side of said system and said aperture stop, and further satisfies the following conditions:

$$0.2 < n_1 - n_2 < 0.45 \quad \text{(I-9)}$$

$$10 < v_1 - v_1 < 60 \quad \text{(I-10)}$$

where $n_1$ and $v_1$ are a refractive index and Abbe's number of a medium of the positive lens located nearest to the object side of said system, respectively; and $n_2$ and $v_2$ are a refractive index and Abbe's number of a medium of the negative meniscus lens having a strong concave surface directed to the image side of said system, respectively.

(7) The wide-angle lens system according to the aforesaid (6), which includes one negative meniscus lens having a strong concave surface directed to the image side of said system between the positive lens located nearest to the object side of said system and said aperture stop, and further satisfies the following conditions:

$$0.5 < D_{2S}/f < 1.5 \quad \text{(I-11)}$$

$$0.3 < r_{22}/f < 1 \quad \text{(I-12)}$$

where $D_{2S}$ is a distance between a surface of the negative meniscus lens nearest to the image side of said system and the aperture stop, and $r_{22}$ is a radius of curvature of a surface of the negative meniscus lens nearest to the image side of said system.

(8) The wide-angle lens system according to any one of the aforesaid (2) to (4), which includes a positive lens and a negative lens between the aperture stop and double-convex lens located nearest to the image side of said system, and further satisfies the following conditions:

$$1 < r_{41}/f < 4 \quad \text{(I-14)}$$

$$0 < n_3 / n_4 < 0.2 \quad \text{(I-15)}$$

$$1.6 < n_4 < 1.85 \tag{I-16}$$

$$0.5 < (D_{S42} - D_{S41})/D_{S41} < 4 \tag{I-17}$$

where $r_{41}$ is a radius of curvature of the object-side surface of the positive lens, and $n_3$ and $n_4$ are refractive indices of media of the negative, and positive lenses.

(10) The wide-angle lens system according to any one of the aforesaid (1) to (9), which further satisfies the following conditions:

$$-5 < f_N/f < -1.5 \tag{I-18}$$

$$0.7 < f_p/f < 2 \tag{I-19}$$

$$1 < D_{FS}/f < 3 \tag{I-20}$$

$$1 < D_{SR}/f < 5 \tag{I-21}$$

where $f_N$, and $f_p$ are composite focal lengths of the negative, and positive lens groups, respectively; $D_{FS}$ is a distance between the surface located nearest to the object side of said system and the aperture stop; and $D_{SR}$ is a distance between the aperture stop and the surface located nearest to the image side of said system.

(11) The wide-angle lens system according to any one of the aforesaid (1) to (10) comprising two lens groups or, in order from an object side of said system, a negative lens group and a positive lens group with an aperture stop midway therebetween, in which, in order from the object side of said system, the negative lens group comprises a positive meniscus lens and a negative meniscus lens having a strong concave surface directed to the image side of said system, two lenses in all, and the positive lens group comprises a double-concave lens and two double-convex lenses, three lenses in all.

The objects of the invention are also achievable by the lens system according to the second embodiment of the invention which may be practiced as mentioned in (1to (14) below.

(1) A wide-angle lens system comprising, in order from an object side of said system, a negative front lens group, an aperture stop, and a positive rear lens group, in which the negative front lens group consists of, in order from the object side of said system, a positive lens larger in power at an object-side surface thereof than at an image-side surface thereof and a negative meniscus lens having a strong concave surface directed to an image side of said system, two lenses in all, and the positive rear lens group consists of up to three lenses in all, including a double-convex form of lens component composed of a single lens or a cemented lens and located nearest to the image side of said system, and which satisfies the following conditions (II-1), (II-2), (II-3), and (II-4):

$$-0.5 < f/f_F < -0.2 \tag{II-1}$$

$$0.2 < D_{FS}/D_{SR} < 1.2 \tag{II-2}$$

$$1.5 < D_{SR}/f < 5 \tag{II-3}$$

$$-0.5 < (r_{R1} + r_{R2})/(r_{R1} - r_{R2}) < 0.5 \tag{II-4}$$

where f is a focal length of the overall lens system, $f_F$ is a focal length of the negative front lens group, $D_{FS}$ is a distance between a surface vertex of the negative front lens group located nearest to the object side of said system and the aperture stop, $D_{SR}$ is a distance between the aperture stop and a surface vertex of the positive rear lens group located nearest to the image side of said system, and $r_{R1}$ and $r_{R2}$ are paraxial radii of curvature of object- and image-side paraxial radii of curvature of object- and image-side surfaces of the double-convex form of lens component of the positive rear lens group located nearest to the image side of said system, respectively.

(2) A wide-angle lens system comprising, in order from an object side of said system, a negative front lens group, an aperture stop, and a positive rear lens group, in which the negative front lens group consists of, in order from the object side of said system, a positive meniscus lens and a negative meniscus lens having a strong concave surface directed to an image side of said system, two lenses in all, and the positive rear lens group consists of up to three lenses in all, including a double-convex form of lens component composed of a single lens or a cemented lens and located nearest to the image side of said system, and which satisfies the following conditions (II-1), (II-2), (II-3), and (II-4):

$$-0.5 < f/f_F < -0.2 \tag{II-1}$$

$$0.2 < D_{FS}/D_{SR} < 1.2 \tag{II-2}$$

$$1.5 < D_{SR}/f < 5 \tag{II-3}$$

$$-0.5 < (r_{R1} + r_{R2})/(r_{R1} - r_{R2}) < 0.5 \tag{II-4}$$

where f is a focal length of the overall lens system, $f_F$ is a focal length of the negative front lens group, $D_{FS}$ is a distance between a surface vertex of the negative front lens group located nearest to the object side of said system and the aperture stop, $D_{SR}$ is a distance between the aperture stop and a surface vertex of the positive rear lens group located nearest to the image side of said system, and $r_{R1}$ and $r_{R2}$ are nearest to the image side of said system, and $r_{R1}$ and $r_{R2}$ are paraxial radii of curvature of object- and image-side surfaces of the double-convex form of lens component of the positive rear lens group located nearest to the image side of said system, respectively.

(3) A wide-angle lens system comprising, in order from an object side of said system, a negative front lens group, an aperture stop, and a positive rear lens group, in which the negative front lens group consists of one negative meniscus lens having an object-side surface defined by an aspheric surface becoming stronger in curvature farther and farther off an optical axis of said system and having a strong concave surface directed to an image side of said system, and the positive rear lens group consists of up to three lenses in all, including a double-convex form of lens component composed of a single lens or a cemented lens and located nearest to the image side of said system, and which satisfies the following conditions (II-1-3), (II-2-3), (II-3), and (II-4):

$$-0.65 < f/f_F < -0.2 \tag{II-1-3}$$

$$0.1 < D_{FS}/D_{SR} < 1.0 \tag{II-2-3}$$

$$1.5 < D_{SR}/f < 5 \tag{II-3}$$

$$<0.5 < (r_{R1} + r_{R2})/(r_{R1} - r_{R2}) < 0.5 \tag{II-4}$$

where f is a focal length of the overall lens system, $f_F$ is a focal length of the negative front lens group, $D_{FS}$ is a distance between a surface vertex of the negative front lens group located nearest to the object side of said system and the aperture stop, $D_{SR}$ is a distance between the aperture stop and a surface vertex of the positive rear lens group located nearest to the image side of said system, and $r_{R1}$ and $r_{R2}$ are paraxial radii of curvature of object- and image-side surfaces of the double-convex form of lens component of the positive rear lens group located nearest to the image side of said system, respectively.

(4) A wide-angle lens system comprising, in order from an object side of said system, a negative front lens group, an aperture stop, and a positive rear lens group, in which the negative front lens group consists of, in order from the object side of said system, a negative meniscus lens having a strong concave surface directed to an image side of said system and a positive lens, two lenses in all, and the positive rear lens group consists of up to three lenses in all, including a double-convex form of lens component composed of a single lens or a cemented lens and located nearest to the image side of said system, and which satisfies the following conditions (II-1-6), (II-2-6), (II-3), (II-4), and (II-5):

$$-0.2 < f/f_F < 0.3 \tag{II-1-6}$$

$$0.3 < D_{FS}/D_{SR} < 1.6 \tag{II-2-6}$$

$$1.5 < D_{SR}/f < 5 \tag{II-3}$$

$$-0.5 < (r_{R1}+r_{R2})/(r_{R1}-r_{R2}) < 0.5 \tag{II-4}$$

$$0.1 < D_{12}/D_{FS} < 0.7 \tag{II-5}$$

where f is a focal length of the overall lens system, $f_F$ is a focal length of the negative front lens group, $D_{FS}$ is a distance between a surface vertex of the negative front lens group located nearest to the object side of said system and the aperture stop, $D_{SR}$ is a distance between the aperture stop and a surface vertex of the positive rear lens group located nearest to the image side of said system, $r_{R1}$ and $r_{R2}$ are paraxial radii of curvature of object- and image-side surfaces of the double-convex form of lens component of the positive rear lens group located nearest to the image side of said system, respectively, and $D_{12}$ is an optical axis air separation between the negative meniscus lens of the negative front lens group that has a strong concave surface directed to the image side of said system and the positive lens.

(5) The wide-angle lens system according to the aforesaid (1) or (2), which conforms to the following conditions (II-1-1), (II-2-1), (II-3-1), and (II-4-1) instead of conditions (II-1), (II-2), (II-3), and (II-4)

$$-0.45 < f/f_F < -0.2 \tag{II-1-1}$$

$$0.4 < D_{FS}/D_{SR} < 1.0 \tag{II-2-1}$$

$$1.5 < D_{SR}/f < 4 \tag{II-3-1}$$

$$-0.3 < (r_{R1}+r_{R2})/(r_{R1}-r_{R2}) < 0.3 \tag{II-4-1}$$

(6) The wide-angle lens system according to the aforesaid (1) or (2), which conforms to the following conditions (II-1-2), (II-2-2), (II-3-2), and (II-4-2) instead of conditions (II-1), (II-2), (II-3), and (II-4):

$$-0.4 < f/f_F < 0.2 \tag{II-1-2}$$

$$0.6 < D_{FS}/D_{SR} < 0.8 \tag{II-2-2}$$

$$1.5 < D_{SR}/f < 3 \tag{II-3-2}$$

$$-0.2 < (r_{R1}+r_{R2})/(r_{R1}-r_{R2}) < 0.2 \tag{II-4-2}$$

(7) The wide-angle lens system according to the aforesaid (3), which conforms to the following conditions (II-1-4), (II-2-4), (II-3-1), and (II-4-1) instead of conditions (II-1-3), (II-2-3), and (II-4):

$$<0.65 < f/f_F < -0.4 \tag{II-1-4}$$

$$0.15 < D_{FS}/D_{SR} < 0.7 \tag{II-2-4}$$

$$1.5 < D_{SR}/f < 4 \tag{II-3-1}$$

$$-0.3 < (r_{R1}+r_{R2})/(r_{R1}-r_{R2}) < 0.3 \tag{II-4-1}$$

(8) The wide-angle lens system according to the aforesaid (3), which conforms to the following conditions (II-1-5), (II-2-5), (II-3-2), and (II-4-2) instead of conditions (II-1-3), (II-2-3), (II-3), and (II-4):

$$-0.65 < f/f_F < -0.5 \tag{II-1-5}$$

$$0.25 < D_{FS}/D_{SR} < 0.5 \tag{II-2-5}$$

$$1.5 < D_{SR}/f < 3 \tag{II-3-2}$$

$$-0.2 < (r_{R1}+r_{R2})/(r_{R1}-r_{R2}) < 0.2 \tag{II-4-2}$$

(9) The wide-angle lens system according to the aforesaid (4), which conforms to the following conditions (II-1-7), (II-2-7), (II-3-1), (II-4-3), and (II-5-1) instead of conditions (II-1-6), (II-2-6), (II-3), (II-4), and (II-5):

$$0.0 < f/f_F < 0.25 \tag{II-1-7}$$

$$0.5 < D_{FS}/D_{SR} < 1.4 \tag{II-2-7}$$

$$1.5 < D_{SR}/f < 4 \tag{II-3-1}$$

$$-0.4 < (r_{R1}+r_{R2})/(R_{R1}-r_{R2}) < 0.4 \tag{II-4-3}$$

$$0.2 < D_{12}/D_{FS} < 0.6 \tag{II-5-1}$$

(10) The wide-angle lens system according to the aforesaid (4), which conforms to the following conditions (II-1-8), (II-2-8), (II-3-2), (II-4-1), and (II-5-3) instead of conditions (II-1-6), (II-2-6), (II-3), (II-4), and (II-5):

$$0.1 < f/f_F < 0.25 \tag{II-1-8}$$

$$0.8 < D_{FS}/D_{SR} < 1.2 \tag{II-2-8}$$

$$1.5 < D_{SR}/f < 3 \tag{II-3-2}$$

$$-0.3 < (r_{R1}+r_{R2})/(r_{R1}-r_{R2}) < 0.3 \tag{II-4-1}$$

$$0.3 < D_{12}/D_{FS} < 0.5 \tag{II-5-3}$$

(11) The wide-angle lens system according to any one of the aforesaid (1) to (4) or any one of the aforesaid (5) to (10), which further conforms to the following conditions (II-6), and (II-7):

$$0.5 < D_{2S}/f < 1.5 \tag{II-6}$$

$$0.5 < R/D_{2S} < 1 \tag{II-7}$$

(12) The wide-angle lens system according to any one of the aforesaid (1) to (4) or any one of the aforesaid (5) to (11), in which the object-side surface of the double-convex form of lens component of the rear lens group located nearest to the image side of said system is defined by an aspheric surface, and which further conforms to the following conditions (II-8) and (II-9):

$$0.5 < D_{SR1}/f < 3 \tag{II-8}$$

$$0.2 < (D_{SR2}-D_{SR1})/R_{SR1} < 3 \tag{II-9}$$

(13) The wide-angle lens system according to any one of the aforesaid (1) to (4) or any one of the aforesaid (5) to (10), which further conforms to the following conditions (II-6-1), (II-7-1), (II-8-1), and (II-9-1):

$$0.6 < D_{2S}/f < 1.3 \tag{II-6-1}$$

$$0.5 < R/D_{2S} < 0.9 \tag{II-7-1}$$

$0.8 < D_{SR1}/f < 2$ (II-8-1)

$0.5 < (D_{SR2} - D_{SR1})/D_{SR1} < 2$ (II-9-1)

(14) The wide-angle lens system according to any one of the aforesaid (1) to (4) or any one of the aforesaid (5) to (10), further conforms to the following conditions (II-6-2), (II-7-2), (II-8-2), and (II-9-2)

$0.7 < D_2/f < 1.1$ (II-6-2)

$0.6 < R/D_2 < 0.8$ (II-7-2)

$1.0 < D_{SR1}/f < 1.7$ (II-8-2)

$0.6 < (D_{SR2} - D_{SR1})/D_{SR1} < 1.5$ (II-9-2)

As can be understood from the foregoing, the present invention can successfully provide a compact and simple wide-angle lens system comprising a reduced number of lenses and having high productivity, which can be well suited for use even on electronic or digital cameras having an extremely limited image pickup region and so an extremely short focal length, while making sure of the space necessary for the edge and middle thicknesses of lens-forming elements and for constructing the system and, at the same time, having a back focus sufficient to accommodate to the insertion of filters, etc., a sufficiently distant exit pupil position, and excellent image-forming capability.

What we claim is:

1. A wide-angle lens system comprising two lens groups, in order from an object side of said system:

a negative lens group; and a positive lens group with an aperture stop midway therebetween, wherein a lens nearest to the object side of said negative lens group is made up of a positive lens that is followed by only a negative meniscus lens having a strong concave surface directed to an image side of said negative lens group, and which, in terms of power and shape of said positive lens located nearest to the object side of said negative lens group, satisfies the following conditions:

$2.5 < f_1/f < 10$ (I-1)

$< 2.5 < (r_1 + r_2)/(r_1 - r_2) < -0.7$ (I-2)

$0.25 < d_1/f < 0.8$ (I-3)

where f is a focal length of the overall lens system, f is a focal length of said positive lens located nearest to the object side of said system, $r_1$ is a radius of curvature of an object-side surface of said positive lens located nearest to the object side of said system, $r_2$ is a radius of curvature of an image-side surface of said positive lens located nearest to the object side of said system, and $d_1$ is an optical axis thickness of said positive lens located nearest to the object side of said system.

2. A wide-angle lens system comprising two lens groups, in order from an object side of said system:

a negative lens group; and a positive lens group with an aperture stop midway therebetween, said positive lens group comprising a double-concave lens element and two double-convex lens elements, wherein said positive lens group includes a double-convex lens located nearest to an image side of said system, and consists of up of three lenses, and which, in terms of power and shape of said double-convex lens located nearest to the image side of said system, conforming to the following conditions:

$1.4 < f_R/f < 3$ (I-4)

$< 0.5 < (r_{R1} + r_{R2})/(r_{R1} - r_{R2}) < 0.5$ (I-5)

$0.5 < d_R/f < 1$ (I-6)

where f is a focal length of the overall lens system, $f_R$ is a focal length of said double-convex lens located nearest to the image side of said system, $r_{R1}$ is a radius of curvature of an object-side surface of said double-convex lens located nearest to the image side of said system, $r_{R2}$ is a radius of curvature of an image-side surface of said double-convex lens located nearest to the image side of said system, and $d_R$ is an optical axis thickness of said double-convex lens located nearest to the image side of said system.

3. A wide-angle lens system comprising two lens group, in order from an object side of said system:

a negative lens group; and a positive lens group with an aperture stop midway therebetween, wherein said negative lens group consists of a positive lens located nearest to the object side of said system and a negative meniscus lens having a strong concave surface directed to an image side of said system, and said positive lens group consists of up to three lenses including a double-convex lens located nearest to the image side of said system, and which, in terms of power and shape of said positive lens located nearest to the object side of said system and said double-convex lens located nearest to the image side of said system, satisfies the following conditions:

$2.5 < f_1/f < 10$ (I-1)

$1.4 < f_R/f < 3$ (I-4)

$-2.5 < (r_1 + r_2)/(r_1 - r_2) < 0.7$ (I-2)

$-0.5 < (r_{R1} + r_{R2})/(r_{R1} - r_{R2}) < 0.7$ (I-5)

$0.25 < d_1/f < 0.8$ (I-3)

$0.5 < d_R/f < 1$ (I-6)

where f is a focal length of the overall lens system, $f_1$ is a focal length of said positive lens located nearest to the object side of said system, $r_1$ is a radius of curvature of an object-side surface of said positive lens located nearest to the object side of said system, $r_2$ is a radius of curvature of an image-side surface of said positive lens located nearest to the object side of said system, $d_1$ in an optical axis thickness of said positive lens located nearest to the object side of said system, $f_R$ is a focal length of said double-convex lens located nearest to the image side of said system, $f_{R1}$ is a radius of curvature of an object-side surface of said double-convex lens located nearest to the image side of said system, $r_{R2}$ is a radius of curvature of an image-side surface of said double-convex lens located nearest to the image side of said system, and $d_R$ is an optical axis thickness of said double-convex lens located nearest to the image side of said system.

4. A wide-angle lens system comprising two lens groups, in order from an object side of said system:

a negative front lens group; and a positive rear lens group with an aperture stop midway therebetween, wherein said negative lens group consists of, in order from the object side of said system, a positive lens larger in power at an object-side surface thereof that at an image-side surface thereof and a negative meniscus lens having a strong concave surface directed to an image side of said system, two lenses in all, and said positive lens group consists of up to three lenses in all, including a double-convex lens component composed of a single lens or a cemented lens and located nearest to the image side of said system, and which satisfies the following conditions:

$$-0.5 < f/f_{F-} - 0.2 \tag{II-1}$$

$$0.2 - D_{FS}/D_{SR} < 1.2 \tag{II-2}$$

$$1.5 < D_{SR}/f < 5 \tag{II-3}$$

$$-0.5 < (r_{R1} + r_{R2})/(r_{R1} - r_{R2}) < 0.5 \tag{II-4}$$

where f is a focal length of the overall lens system, $f_F$ is a focal length of said negative lens group, $D_{FS}$ is a distance between a surface vertex of said negative lens group located nearest to the object side of said system and said aperture stop, $D_{SR}$ is a distance between said aperture stop and a surface vertex of said positive lens group located nearest to the image side of said system, and $r_{R1}$ and $r_{R2}$ are paraxial radii of curvature of object- and image-side surfaces of the double-convex lens component of said positive lens group located nearest to the image side of said system, respectively.

5. A wide-angle lens system comprising two lens groups, in order from an object side of said system:

a negative front lens group; and a positive rear lens group with an aperture stop midway therebetween, wherein said negative lens group consists of, in order from the object side of said system, a positive meniscus lens and a negative meniscus lens having a strong concave surface directed to an image side of said system, two lenses in all, and said positive lens group consists of up to three lenses in all, including a double-convex lens component composed of a single lens or a cemented lens and located nearest to the image side of said system, and which satisfies the following conditions:

$$-0.5 < f/f_F < -0.2 \tag{II-1}$$

$$0.2 < D_{FS}/D_{SR} < 1.2 \tag{II-2}$$

$$1.5 < D_{SR}/f < 5 \tag{II-3}$$

$$-0.5 < (r_{R1} + r_{R2})/(r_{R1} - r_{R2}) < 0.5 \tag{II-4}$$

where f is a focal length of the overall lens system, $f_F$ is a focal length of said negative lens group, $D_{FS}$ is a distance between a surface vertex of said negative lens group located nearest to the object side of said system and said aperture stop, $D_{SR}$ is a distance between said aperture stop and a surface vertex of said positive lens group located nearest to the image side of said system, and $r_{R1}$ and $r_{R2}$ are paraxial radii of curvature of object- and image-side surfaces of the double-convex lens component of said positive lens group located nearest to the image side of said system, respectively.

6. A wide-angle lens system comprising two lens groups, in order from an object side of said system a negative lens group; and a positive lens group with an aperture stop midway therebetween, wherein said negative lens group consists of, in order from the object side of said system, a negative meniscus lens having a strong concave surface directed to an image side of said system and a positive lens, two lenses in all, and said positive lens group consists of up to three lenses in all, including a double-convex lens component composed of a single lens or a cemented lens and located nearest to the image side of said system, and which satisfies the following conditions:

$$-0.2 < f/f_F < 0.3 \tag{II-1-6}$$

$$0.3 < D_{FS}/D_{SR}/f < 1.6 \tag{II-2-6}$$

$$1.5 < D_{SR}/f < 5 \tag{II-3}$$

$$-0.5 < (r_{R1} + r_{R2})/(r_{R1} - r_{R2}) < 0.5 \tag{II-4}$$

$$0.1 < D_{12}/D_{FS} < 0.7 \tag{II-5}$$

where f is a focal length of the overall lens system, $f_F$ is a focal length of said negative lens group, $D_{FS}$ is a distance between a surface vertex of said negative lens group located nearest to the object side of said system and said aperture stop, $D_{SR}$ is a distance between said aperture stop and a surface vertex of said positive lens group located nearest to the image side of said system, $r_{R1}$ and $r_{R2}$ are paraxial radii of curvature of object- and image-side surfaces of the double-convex lens component of said positive lens group and located nearest to the image side of said system, respectively, and $D_{12}$ is an optical axis air separation between the negative meniscus lens of said negative lens group that has a strong concave surface directed to the image side of said system and said positive lens.

* * * * *